United States Patent
Takegami et al.

(10) Patent No.: US 6,986,259 B2
(45) Date of Patent: Jan. 17, 2006

(54) REFRIGERATOR

(75) Inventors: Masaaki Takegami, Osaka (JP); Kenji Tanimoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 29 days.

(21) Appl. No.: 10/479,829

(22) PCT Filed: Mar. 25, 2003

(86) PCT No.: PCT/JP03/03659

§ 371 (c)(1),
(2), (4) Date: Dec. 5, 2003

(87) PCT Pub. No.: WO03/085332

PCT Pub. Date: Oct. 16, 2003

(65) Prior Publication Data

US 2004/0159111 A1 Aug. 19, 2004

(30) Foreign Application Priority Data

Apr. 8, 2002 (JP) ........................................ 2002-105636

(51) Int. Cl.
F25B 43/02 (2006.01)
F25B 31/00 (2006.01)

(52) U.S. Cl. ............................... 62/84; 62/192; 62/471
(58) Field of Classification Search .................... 62/84, 62/192, 193, 468, 470, 471, 473
See application file for complete search history.

(56) References Cited

U.S. PATENT DOCUMENTS 5,249,432 A * 10/1993 Ichikawa ...................... 62/197
2002/0112492 A1 * 8/2002 Suitou et al. ................. 62/225

FOREIGN PATENT DOCUMENTS

| JP | 62-119366 A | 5/1987 |
| JP | 5-187380 A | 6/1993 |
| JP | 10-47800 A | 2/1998 |
| JP | 2001-174082 A | 6/2001 |
| JP | 2001-280719 A | 10/2001 |

* cited by examiner

*Primary Examiner*—Marc Norman
(74) *Attorney, Agent, or Firm*—Birch, Stewart, Kolasch & Birch, LLP

(57) ABSTRACT

Disclosed is a refrigerating apparatus using a temperature sensitive expansion valve (46) as an expansion mechanism. In the refrigerating apparatus, a switching valve (7a) is disposed on the upstream side of an evaporator (45). The switching valve (7a) is closed for a while, thereby forcibly placing an outlet side of the evaporator (45) in the superheat state to increase the valve travel of the expansion valve (46). Thereafter, the switching valve (7a) is opened for liquid refrigerant to flow through the evaporator (45) so that a wettish operation is carried out. As a result of such arrangement, refrigerating machine oil that has accumulated in the evaporator (45) is reclaimed and returned to a compression mechanism (2D).

6 Claims, 15 Drawing Sheets

REFRIGERATOR

TECHNICAL FIELD

This invention relates to refrigerating apparatus of the vapor compression refrigerating cycle and, more particularly, to a refrigerating apparatus provided with an oil reclaim mechanism capable of reclaiming refrigerating machine oil that has accumulated in the evaporator and returning it to the compressor.

BACKGROUND ART

Refrigerating apparatus which perform a vapor compression refrigerating cycle have been known in the prior art. This type of refrigerating apparatus has been used widely as air conditioners for room cooling and heating, and cooling apparatus such as refrigerators and freezers for the storage of foods. In this refrigerating apparatus, the refrigerant discharged from the compressor flows, in sequence, in a condenser, an expansion mechanism, and an evaporator in the refrigerant circuit, whereby a vapor compression refrigerating cycle is executed.

In the refrigerant circuit, not only refrigerant but also refrigerating machine oil for lubricating the inside of a compressor is discharged from the compressor. Japanese Patent Application Kokai No. (2001)280719 shows a technique for reclaiming such discharged refrigerating machine oil and returning it to the compressor. More specifically, an oil separator, disposed on the discharge side of the compressor, is connected, via an oil return passage way, to a suction pipe of the compressor. Usually, a switching valve is inserted in the oil return passage way. In this arrangement, by placing the switching valve in the opened position, the refrigerating machine oil separated from discharged gas refrigerant in the oil separator is returned, via the oil return passage way and the suction pipe, to the compressor.
Problems To Be Solved However, all of the refrigerating machine oil contained in the discharged gas refrigerant is not brought back to the compressor by the oil separator, in other words some refrigerating machine oil will circulate through the refrigerant circuit together with the refrigerant. And, with the elapse of time since the refrigerant was circulated through the refrigerant circuit, refrigerating machine oil accumulates little by little in the evaporator. To cope with the accumulation of refrigerating machine oil in the evaporator, in a conventional refrigerating apparatus of the type which uses, as an expansion mechanism, a valve-travel controllable expansion mechanism such as an electric expansion valve, the expansion valve is opened a little more than usual to allow a large amount of liquid refrigerant to flow through the evaporator so that a wettish operation is carried out, in order to reclaim refrigerating machine oil that has accumulated in the evaporator and return it to the compressor.

In spite of such arrangement, if the expansion mechanism is implemented by an expansion valve of the temperature sensitive type, this makes it difficult to perform a wet operation by forcibly controlling the valve travel, and it is also difficult to reclaim refrigerating machine oil from the evaporator to the compressor.

Bearing in mind these problems, the present invention was made. Accordingly, an object of the present invention is to provide a refrigerating apparatus employing, as an expansion mechanism, a temperature sensitive expansion valve, in which refrigerating machine oil that has accumulated in the evaporator is brought back to the compressor.

DISCLOSURE OF INVENTION

In the present invention, a switching valve (7a) is disposed upstream of an evaporator (45), and it is controlled such that, after an outlet side of the evaporator (45) is forcibly placed in the superheat state by closing the switching valve (7a) for a while, the switching valve (7a) is opened.

More specifically, an embodiment of the present nvention is directed to a refrigerating apparatus comprising a refrigerant circuit (1E) along which are provided a compression mechanism (2D), a condenser (4), an expansion mechanism (46), and an evaporator (45) all connected in sequence, and an oil reclaim mechanism (7a, 80) for reclaiming refrigerating machine oil that has accumulated in the evaporator (45) and returning it to the compression mechanism (2D).

The refrigerating apparatus of this embodiment is characterized in that: the expansion mechanism (46) is a temperature sensitive type expansion valve whose valve travel is controlled based on the state of refrigerant on the side of an outlet of the evaporator (45); the oil reclaim mechanism (7a, 80) includes a switching valve (7a) connected to an upstream side of the evaporator (45) and a control means (80) for controlling the switching valve (7a); and the control means (80) is configured so that, in an oil reclaim operation, the degree of superheat of the outlet of the evaporator (45) is increased by operating the refrigerating apparatus with the switching valve (7a) placed in the closed position for a predetermined length of time, after which the refrigerating apparatus is operated with the switching valve (7a) placed in the opened position.

In the invention of this embodiment, when refrigerating machine oil accumulates in the evaporator (45) during vapor compression refrigerating cycle operation, the switching valve (7a) on the upstream side of the evaporator (45) is placed in the closed position for a while by the control means (80) of the oil reclaim mechanism (7a, 80). In this state, the refrigerating apparatus is operated continuously for a predetermined length of time. As a result, the rate of flow of refrigerant on the outlet side of the evaporator (45) falls and its degree of superheat increases accordingly. When the degree of superheat of the outlet of the evaporator (45) increases in this way, the valve travel of the temperature sensitive expansion valve (46) is increased for making compensation for a deficiency in the refrigerant flow rate. Thereafter, the switching valve (7a) is placed in the opened position, thereby causing a relatively large amount of liquid refrigerant after condensation flows into the evaporator (45). Accordingly, refrigerating machine oil that has accumulated inside the evaporator (45) is flowed out by this liquid refrigerant, and is reclaimed and returned to the compression mechanism (2D).

Although liquid refrigerant flows into the evaporator (45) in large amounts during the oil reclaim operation, most of the liquid refrigerant evaporates in the evaporator (45). In addition, if the rate of flow of refrigerant is too great, there is the possibility for the occurrence of wet vapor suction. Therefore, it is advisable that the rate of flow of refrigerant is set to such a value that does not bring on liquid compression due to liquid back.

According to an embodiment of the present invention, the refrigerating apparatus characterized in that the control means (80) is configured so that an oil reclaim operation is carried out when the operating time of the compression mechanism (2D) amounts, in continuity or in total, to a predetermined length of time.

In this embodiment, when the operating time of the compression mechanism (2D) amounts, in continuity or in total, to a predetermined length of time, the switching valve (7a) is once placed in the closed position for a while and, thereafter, is placed in the opened position so that an oil reclaim operation is performed, because there is a possibility that refrigerating machine oil has accumulated in the evaporator (45). This operation is repeatedly carried out every time the operating time of the compression mechanism (2D) amounts to a predetermined length of time, thereby suppressing the accumulation of refrigerating machine oil inside the evaporator (45).

According to an embodiment of the present invention, refrigerating apparatus of is characterized in that the control means (80) is configured so that the switching valve (7a) is placed in the opened position if, during an oil reclaim operation, the pressure of refrigerant on the suction side of the compression mechanism (2D) falls below a predetermined value before a predetermined length of time has elapsed since the switching valve (7a) was placed in the closed position.

In this embodiment, if the pressure of refrigerant on the suction side of the compression mechanism (2D) falls too low, the switching valve (7a) is forcibly placed in the opened position to cause liquid refrigerant to flow even when a predetermined length of time has not yet elapsed since the switching valve (7a) was placed in the closed position. This is because that, if the level of the low pressure falls too low, this produces a state in which refrigerant flows, in only a very small amount, through the evaporator (45), in other words no cooling capacity is obtained. However, the invention of this embodiment ensures that refrigerant flows through the evaporator (45), and the cooling capacity will not drop.

According to an embodiment of the present invention, the refrigerating apparatus of is characterized in that the compression mechanism (2D) is variable in displacement, and that the control means (80) is configured so that, at the time when placing the switching valve (7a) in the opened position during an oil reclaim operation, the operational displacement of the compression mechanism (2D) is set to such a displacement value that refrigerating machine oil inside the evaporator (45) is reclaimed by refrigerant.

In this embodiment, the operational displacement of the compression mechanism (2D) is so controlled as to assume a predetermined displacement value when the switching valve (7a) is placed in the opened position after the degree of superheat of the outlet side of the evaporator (45) is increased by placing the switching valve (7a) in the closed position for a while during an oil return operation, thereby ensuring that refrigerating machine oil that has accumulated inside the evaporator (45) is reclaimed and returned to the compression mechanism (2D). In addition, it is advisable that, after a predetermined length of time has elapsed since the operational displacement of the compression mechanism (2D) was set, such a setting is cancelled to complete the oil reclaim operation.

According to an embodiment of the present invention, the refrigerating apparatus is characterized in that the control means (80) is configured so that execution of a thermo off operation is inhibited during an oil reclaim operation.

In the invention as set forth in claim 5, the execution of a thermo off operation is inhibited during an oil reclaim operation.

In this embodiment, the execution of a thermo off operation is inhibited during an oil reclaim operation. The thermo off operation is a downtime operation in which only an air blowing operation is carried out while stopping any inflow of refrigerant into the evaporator (45), so that if carried out during an oil reclaim operation no liquid refrigerant flows into the evaporator (45). Inhibition of the execution of a thermo off operation makes it possible to preferentially perform an oil reclaim operation.

In this embodiment, it is ensured that, in a so-called multi type refrigerating apparatus in which a plurality of evaporators (45) are connected in parallel, refrigerating machine oil that has accumulated in each evaporator (45) is reclaimed. Stated anothe way, in a multi type refrigerating apparatus, refrigerant is drawn into a single compression mechanism (2D) from a plurality of evaporators (45), so that refrigerating machine oil is more likely to accumulate inside the evaporator (45) in comparison with the arrangement in which an evaporator (45) and a compression mechanism (2D) are connected in a one-to-one relationship. However, the configuration of the inventionof this embodiment ensures that an oil reclaim opeartion is carried out by forcibly performing a wettish operation by operation of the switching valves (7a).

EFFECTS OF INVENTION

In accordance with an embodiment of the invention the switching valve (7a) is disposed on the upstream side of the evaporator (45), and the switching valve (7a) is once placed in the closed position for a while so that the outlet side of the evaporator (45) is forced to enter the superheat state. After the temperature sensitive expansion valve (46) opens, the switching valve (7a) is placed in the opened position so that liquid refrigerant flows, at a rapid rate, into the evaporator (45). As a result of such arrangement, refrigerating machine oil that has accumulated in the evaporator (45) is reclaimed and returned to the compression mechanism (2D). In addition, if it is set such that the rate of flow of refrigerant that flows into the evaporator (45) does not become too great, this prevents the occurrence of operational inconvenience brought on by liquid back.

In accordance with an embodiment of the invention an oil reclaim operation can be carried out by operating the switching valve (7a) every time the operational time of the compression mechanism (2D) amounts, in continuity or in total, to a predetermined length of time, thereby making it possible to prevent the compression mechanism (2D) from undergoing oil shortage due to the accumulation of refrigerating machine oil inside the evaporator (45).

In accordance with an embodiment of the invention it is arranged such that, during an oil reclaim operation, the switching valve (7a) is forcibly placed in the opened position if the pressure of refrigerant on the suction side of the compression mechanism (2D) falls below a predetermined value before a predetermined length of time has elapsed since the switching valve (7a) was placed in the closed position. This arrangement ensures that an oil reclaim operation is carried out while preventing the occurrence of such a state that the pressure of refrigerant on the suction side falls too low to obtain cooling capacity.

Furthermore, in accordance with an embodiment of the invention it is ensured that refrigerating machine oil in the evaporator (45) is reclaimed by controlling the operational displacement of the compression mechanism (2D) to a predetermined value in an oil reclaim operation.

Additionally, in accordance with an embodiment of the invention, the execution of a thermo off operation is inhibited during an oil reclaim operation. That is, an oil reclaim operation can be carried out preferentially. This prevents the occurrence of operational inconvenience during an oil reclaim operation. Furthermore, in order to prevent refrigerant from flowing into the evaporator (45) during a thermo off operation, generally the switching valve (7a) is disposed upstream of the evaporator (45). If the switching valve (7a) is used also in an oil reclaim operation, this makes it possible to prevent the configuration of refrigerating apparatus from becoming complicated.

Finally, in accordance with an accordance of the invention, for the case of a multi type refrigerating apparatus in which refrigerant from each of a plurality of evaporators (45) is drawn into a single compression mechanism (2D), refrigerating machine oil is more likely to accumulate inside each evaporator (45) in comparison with a refrigerating apparatus including an evaporator (45) and a compression mechanism (2D) which are connected together in a one-to-one relationship. However, in accordance with this embodiment, it becomes possible to ensure that an oil reclaim operation is carried out by forcibly performing a wettish operation by the operation of the switching valve (7a) even in such a multi type refrigerating apparatus. Accordingly, when applied to a multi type refrigerating apparatus, this embodiment ensures that extremely high oil reclaim effects are obtained.

BEST MODE FOR CARRYING OUT INVENTION

Figure 1:
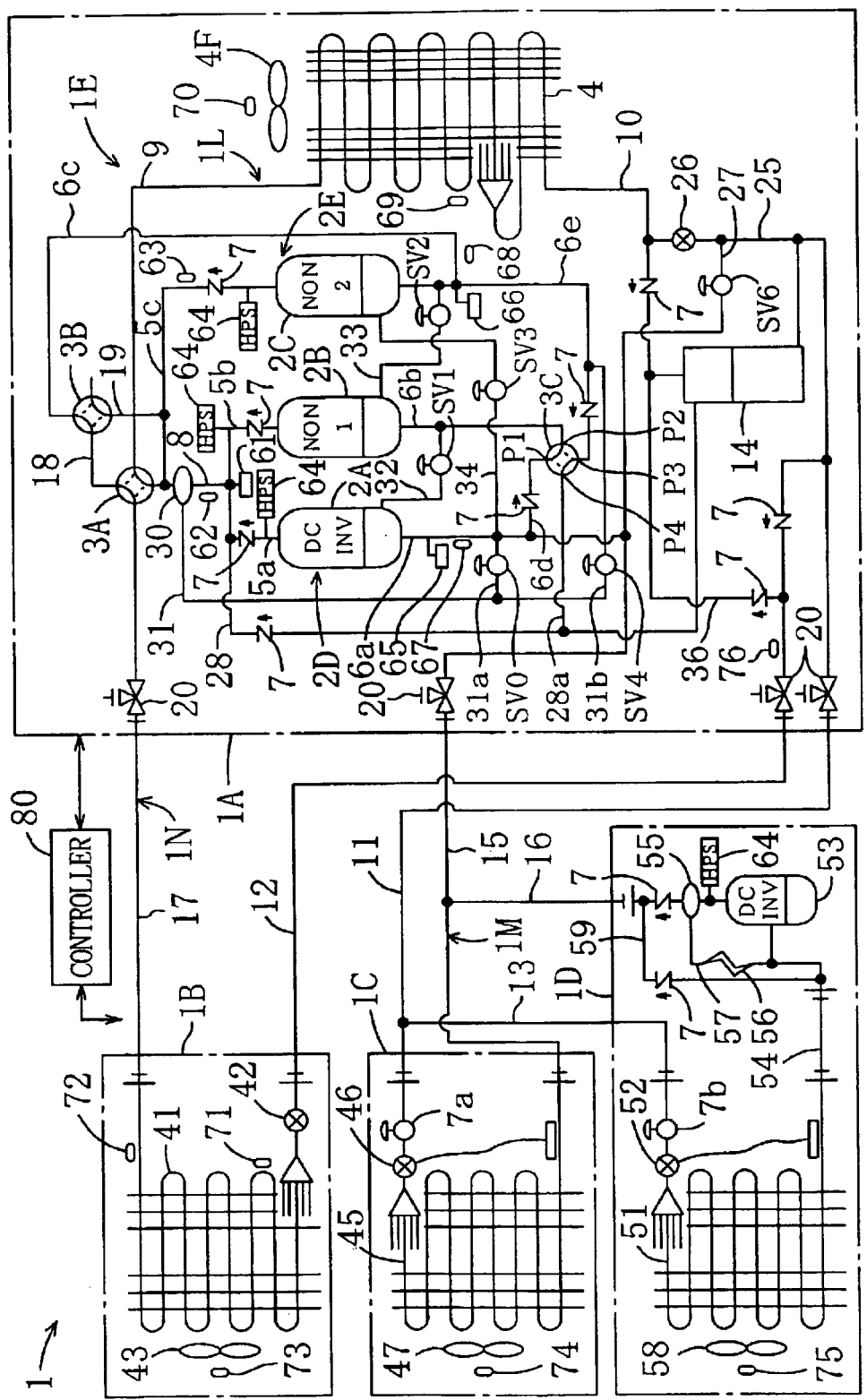
FIG. 1 is a refrigerant circuit diagram of a refrigerating apparatus according to an embodiment of the present invention.

Hereinafter, an embodiment of the present invention will be described in detail with reference to the drawing figures.

A refrigerating apparatus (1) of the present embodiment is installed in a convenience store or the like for cooling the inside of cold and freeze storage showcases as well as for air conditioning (cooling and heating) the inside of the store.

As shown in FIG. 1, the refrigerating apparatus (1) includes an outdoor unit (1A), an indoor unit (1B), a cold storage unit (1C), and a freeze unit (1D). The refrigerating apparatus (1) further includes a refrigerant circuit (1E) which performs a vapor compression refrigerating cycle. The refrigerant circuit (1E) is comprised of a first channel side circuit for cold storage and freeze storage, and a second channel side circuit for air conditioning. The refrigerant circuit (1E) is so configured as to switch between a cooling cycle and a heating cycle.

Figure 15:
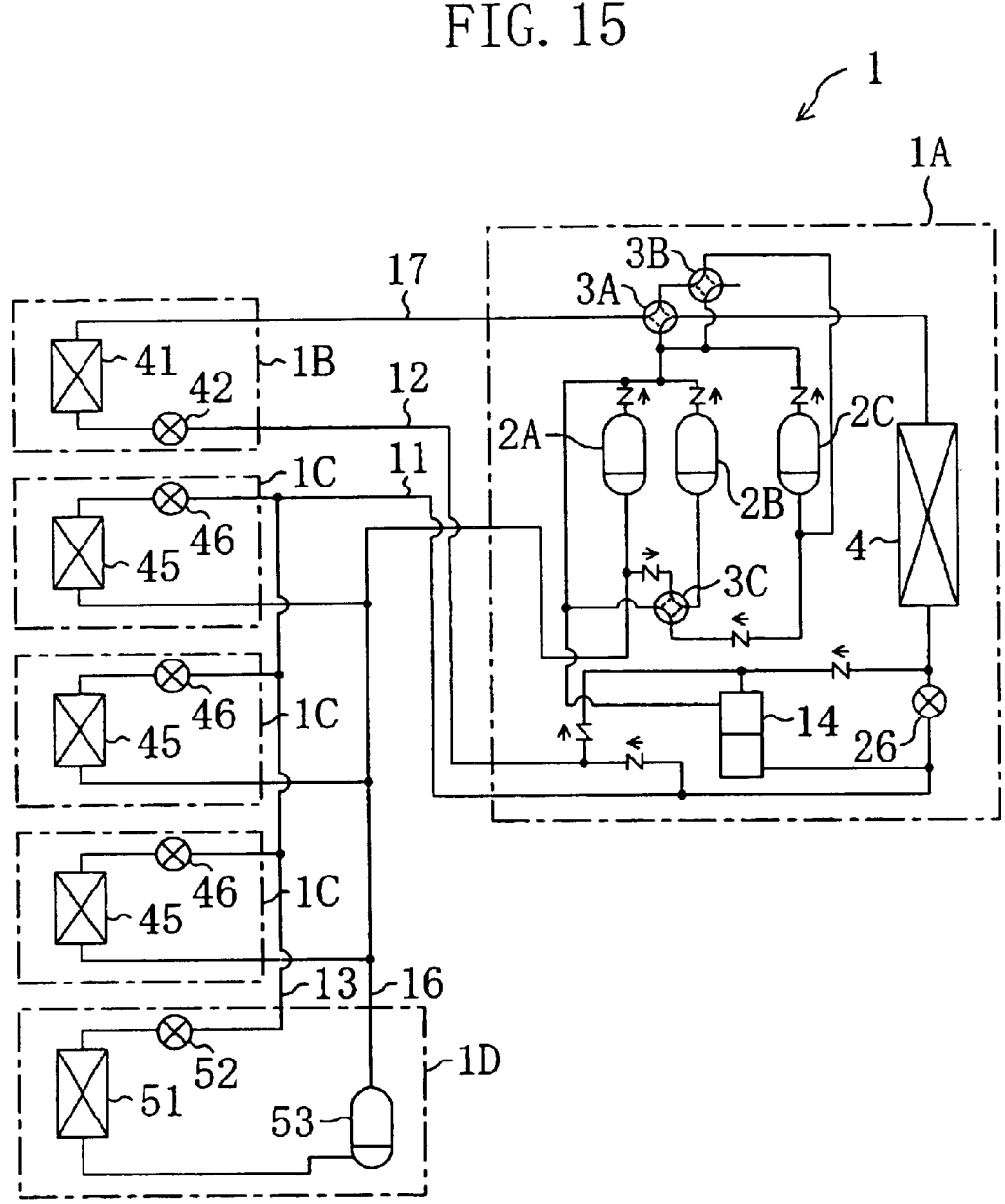
FIG. 15 is an entire construction diagram of a refrigerating apparatus provided with a plurality of cold storage units.

The indoor unit (1B) is so configured as to switch between a cooling mode of operation and a heating mode of operation. The indoor unit (1B) is installed, for example, in a selling area of the store. Additionally, the cold storage unit (1C) is disposed in a cold storage showcase, and cools air in the inside of the cold storage showcase. The freeze unit (1D) is disposed in a freeze storage showcase, and cools air in the inside of the freeze storage showcase. FIG. 1 shows a single indoor unit (1B), a single cold storage unit (1C), and a single freeze unit (1D); however, in the present embodiment, as shown in FIG. 15, one indoor unit (1B), three cold storage units (1C), and one freeze storage unit (1D) are connected to the refrigeration circuit (1E).

Outdoor Unit

The outdoor unit (1A) includes an inverter compressor (2A) which is a first compressor, a first non inverter compressor (2B) which is a second compressor, and a second non inverter compressor (2C) which is a third compressor. The outdoor unit (1A) further includes a first four way selector valve (3A), a second four way selector valve (3B), a third four way selector valve (3C), and an outdoor heat exchanger (4) which is a heat source side heat exchanger.

Each of the compressors (2A, 2B, 2C) is for example a high pressure dome scroll compressor of the hermetic sealed type. The inverter compressor (2A) is a variable displacement compressor whose displacement is varied step by step or continuously by inverter controlling an electric motor. Both the first non inverter compressor (2B) and the second non inverter compressor (2C) are fixed displacement compressors, in other words their electric motors are driven at constant revolution speed.

The inverter compressor (2A), the first non inverter compressor (2B), and the second non inverter compressor (2C) together make up a compression mechanism (2D, 2E) of the refrigerating apparatus (1), and the compression mechanism (2D, 2E) is made up of a compression mechanism (2D) of a first system and a compressor (2E) of a second system. More specifically, during operation, the compression mechanism (2D, 2E) is constituted in the following two manners in one of which the inverter compressor (2A) and the first non inverter compressor (2B) together make up the compression mechanism (2D) of the first system while the second non inverter compressor (2C) constitutes the compression mechanism (2E) of the second system and in the other of which the inverter compressor (2A) constitutes the compression mechanism (2D) of the first system while the first non inverter compressor (2B) and the second non inverter compressor (2C) together make up the compression mechanism (2E) of the second system. In other words, the inverter compressor (2A) and the second non inverter compressor (2C) are used in a first channel side circuit for cold and freeze storage and in a second channel side circuit for air conditioning, respectively. On the other hand, the first non inverter compressor (2B) can be used, in a switching manner, in the first channel side circuit or in the second channel side circuit.

Each of discharge pipes (5a, 5b, 5c) of the compressors (2A, 2B, 2c) is connected to a single high pressure gas pipe (discharge line) (8), and the high pressure gas pipe (8) is connected to a port of the first four way selector valve (3A). The discharge pipe (5a) of the inverter compressor (2A), the discharge pipe (5b) of the first non inverter compressor (2B), and the discharge pipe (5c) of the second non inverter compressor (2C) are each provided with a respective check valve (7).

A gas side end of the outdoor beat exchanger (4) is connected to a port of the first four way selector valve (3A) by an outdoor gas pipe (9). One end of a liquid pipe (10) which is a liquid line is connected to a liquid side end of the outdoor heat exchanger (4). A receiver (14) is disposed midway in the liquid pipe (10), and the other end of the liquid pipe (10) is branched off into a first interunit liquid pipe (11) and a second interunit liquid pipe (12).

The outdoor heat exchanger (4) is, for example, a fin and tube heat exchanger of the cross fin type, and an outdoor fan (4F) which is a heat source fan is disposed near the outdoor heat exchanger (4).

Connected to a port of the first four way selector valve (3A) is an interunit gas pipe (17). A port of the first four way selector valve (3A) is connected to a port of the second four way selector valve (3B) by a connecting pipe (18). A port of the second four way selector valve (3B) is connected to the discharge pipe (5c) of the second non inverter compressor (2C) by an auxiliary gas pipe (19). In addition, a suction pipe (6c) of the second non inverter compressor (2C) is connected to a port of the second four way selector valve (3B). A port of the second four way selector valve (3B) is a closed port. Stated another way, the second four way selector valve (3B) may be implemented by a three way selector valve.

The first four way selector valve (3A) is so configured as to switch between a first state (indicated by the solid lines in FIG. 1) in which the high pressure gas pipe (8) and the outdoor gas pipe (9) are in a communicating relationship while the connecting pipe (18) and the interunit gas pipe (17) are in a communicating relationship, and a second state (indicated by the broken lines of FIG. 1) in which the high pressure gas pipe (8) and the interunit gas pipe (17) are in a communicating relationship while the connecting pipe (18) and the outdoor gas pipe (9) are in a communicating relationship.

Furthermore, the second four way selector valve (3B) is so configured as to switch between a first state (indicated by the solid lines in FIG. 1) in which the auxiliary gas pipe (19) and the closed port are in a communicating relationship while the connecting pipe (18) and the suction pipe (6c) of the second non inverter compressor (2C) are in a communicating relationship, and a second state (indicated by the broken line of FIG. 1) in which the auxiliary gas pipe (19) and the connecting pipe (18) are in a communicating relationship while the suction pipe (6c) and the closed port are in a communicating relationship.

A suction pipe (6a) of the inverter compressor (2A) is connected to a low pressure gas pipe (15) of the first channel side circuit. The suction pipe (6c) of the second non inverter compressor (2C) is connected, via the first and second four way selector valves (3A, 3B), to a low pressure gas pipe of the second channel side circuit (i.e., either to the interunit gas pipe (17) or to the outdoor gas pipe (9)). In addition, the suction pipe (6b) of the first non inverter compressor (2B) is connected, via the third four way selector valve (3C) which will be described later, to the suction pipe (6a) of the inverter compressor (2A) as well as to the suction pipe (6c) of the second non inverter compressor (2C).

More specifically, a branch pipe (6d) is connected to the suction pipe (6a) of the inverter compressor (2A), and a branch pipe (6e) is connected to the suction pipe (6c) of the second non inverter compressor (2C). And, the branch pipe (6d) of the suction pipe (6a) of the inverter compressor (2A) is connected, via the check valve (7), to a first port (P1) of the third four way selector valve (3C). The suction pipe (6b) of the first non inverter compressor (2B) is connected to a second port (P2) of the third four way selector valve (3C). The branch pipe (6e) of the suction pipe (6c) of the second non inverter compressor (2C) is connected, via the check valve (7), to a third port (P3) of the third four way selector valve (3C). In addition, connected to a fourth port (P4) of the third four way selector valve (3C) is a branch pipe (28a) of a gas vent pipe (28) extending from the receiver (14) which will be described later. The check valves disposed in the branch pipes (6d, 6e) are operable to allow only a flow of refrigerant moving in the direction of the third four way selector valve (3C).

The third four way selector valve (3C) is so configured as to switch between a first state (indicated by the solid lines in the figure) in which the first port (P1) and the second port (P2) are in a communicating relationship while the third port (P3) and the fourth port (P4) are in a communicating relationship, and a second state (indicated by the broken lines of the figure) in which the first port (P1) and the fourth port (P4) are in a communicating relationship while the second port (P2) and the third port (P3) are in a communicating relationship.

The discharge pipes (5a, 5b, 5c), the high pressure gas pipe (8), and the outdoor gas pipe (9) together make up a high pressure gas line (1L) in the cooling mode of operation. On the other hand, the low pressure gas pipe (15) and the suction pipes (6a, 6b) of the compression mechanism (2D) of the first system together make up a first low pressure gas line (1M). In addition, the interunit gas pipe (17) and the suction pipe (6c) of the compression mechanism (2E) of the second system together make up a second low pressure gas line (1N) in the cooling mode of operation.

The first interunit liquid pipe (11), the second interunit liquid pipe (12), the interunit gas pipe (17), and the low pressure gas pipe (15) extend from the outdoor unit (1A) to the outside, and shut off valves (20) associated with these pipes are provided in the inside of the outdoor unit (1A). Furthermore, the second interunit liquid pipe (12) is provided, at an end thereof on the side where it branches off from the liquid pipe (10), with a check valve (7), whereby refrigerant flows from the receiver (14) toward the shut off valve (20).

An auxiliary liquid pipe (25) which bypasses the receiver (14) is connected to the liquid pipe (10). Refrigerant flows through the auxiliary liquid pipe (25), mainly during the heating mode of operation, and the auxiliary liquid pipe (25) is provided with an outdoor expansion valve (26) which is an expansion mechanism. Disposed between the outdoor heat exchanger (4) and the receiver (14) in the liquid pipe (10) is a check valve (7) which permits only a flow of refrigerant moving in the direction of the receiver (14). The check valve (7) is inserted between a connecting portion of the auxiliary liquid pipe (25) in the liquid pipe (10) and the receiver (14).

The liquid pipe (10) branches off between the check valve (7) and the receiver (14) to become a branch liquid pipe (36). The branch liquid pipe (36) is connected between the shut off valve (20) and the check valve (7) in the second interunit liquid pipe (12). The branch liquid pipe (36) is provided with a check valve (7) which permits only a flow of refrigerant moving from the second interunit liquid pipe (12) toward the receiver (14).

Connected between the auxiliary liquid pipe (25) and the low pressure gas pipe (15) is a liquid injection pipe (27). The liquid injection pipe (27) is provided with a solenoid valve (SV6). In addition, a gas vent pipe (28) is connected between an upper portion of the receiver (14) and the discharge pipe (5a) of the inverter compressor (2A). The gas vent pipe (28) is provided with a check valve (7) which permits only a flow of refrigerant moving from the receiver (14) toward the discharge pipe (5a). Furthermore, as described hereinabove, the branch pipe (28a) of the gas vent pipe (28) is connected to the fourth port (P4) of the third four way selector valve (3C).

The high pressure gas pipe (8) is provided with an oil separator (30). One end of an oil return pipe (31) is connected to the oil separator (30). The other end of the oil return pipe (31) is branched off into a first oil return pipe (31a) and to a second oil return pipe (31b). The first oil return pipe (31a) is provided with a solenoid valve (SV0), and is connected to the suction pipe (6a) of the inverter compressor (2A). In addition, the second oil return pipe (31b) is provided with a solenoid valve (SV4), and is connected to the branch pipe (6e) of the suction pipe (6c) of the second non inverter compressor (2C).

A first oil leveling pipe (32) is connected between a dome (oil sump) of the inverter compressor (2A) and the suction pipe (6b) of the first non inverter compressor (2B). A second oil leveling pipe (33) is connected between a dome of the first non inverter compressor (2B) and the suction pipe (6c) of the second non inverter compressor (2C). A third oil leveling pipe (34) is connected between a dome of the second non inverter compressor (2C) and the suction pipe (6a) of the inverter compressor (2A). The first oil leveling pipe (32), the second oil leveling pipe (33), and the third oil leveling pipe (34) are provided with solenoid valves (SV1, SV2, SV3), respectively. The solenoid valves (SV1, SV2, SV3) are switching mechanisms.

Indoor Unit

The indoor unit (1B) has an indoor heat exchanger (41) (air conditioning heat exchanger) which is an application side heat exchanger, and an indoor expansion valve (42) which is an expansion mechanism. A gas side of the indoor heat exchanger (41) is connected to the interunit gas pipe (17). On the other hand, a liquid side of the indoor heat exchanger (41) is connected, via the indoor expansion valve (42), to the second interunit liquid pipe (12). The indoor heat exchanger (41) is implemented, for example, by a fin and tube heat exchanger of the cross fin type, and an indoor fan (43) which is an application side fan is disposed near the indoor heat exchanger (41). In addition, the indoor expansion valve (42) is formed by an electric expansion valve.

Cold Storage Unit

As can be seen from FIG. 15 which shows an entire arrangement of the refrigerating apparatus (1) (its circuit construction is illustrated in a simplified manner), three cold storage units (1C) are connected in parallel to the outdoor unit (1A). Each of the cold storage units (1C) includes a cold storage heat exchanger (45) which is a cooling heat exchanger (evaporator) and a cold storage expansion valve (46) which is an expansion mechanism. In addition, as shown in detail in FIG. 1, a liquid side of each cold storage heat exchanger (45) is connected, via the solenoid valve (7a) and the cold storage expansion valve (46), to the first interunit liquid pipe (11). In other words, disposed upstream of each cold storage heat exchanger (45) are the cold storage expansion valve (46) and the solenoid valve (7a) which is a switching valve. The solenoid valve (7b) is used in the thermo off operation and is used also for the reclaiming of refrigerating machine oil in the inside of the cold storage heat exchanger (45). On the other hand, the low pressure gas pipe (15) is connected to a gas side of the cold storage heat exchanger (45).

The cold storage heat exchanger (45) is in communication with a suction side of the compression mechanism (2D) of the first system, while on the other hand the indoor heat exchanger (41) is in communication with a suction side of the second non inverter compressor (2C) during the cooling mode of operation. The pressure of refrigerant (evaporating pressure) of the cold storage heat exchanger (45) is lower than the pressure of refrigerant (evaporating pressure) of the indoor heat exchanger (41). As the result of this, the refrigerant evaporating temperature of the cold storage heat exchanger (45) is, for example, −10 degrees Centigrade and the refrigerant evaporating temperature of the indoor heat exchanger (41) is, for example, +5 degrees Centigrade, and the refrigerant circuit (1E) constitutes a different temperature evaporation circuit.

In addition, the cold storage expansion valve (46) is a temperature sensitive expansion valve whose temperature sensing bulb is mounted on the gas side of the cold storage heat exchanger (45). Accordingly, the valve travel of the cold storage expansion valve (46) is controlled based on the temperature of refrigerant on the outlet side of the cold storage heat exchanger (45). The cold storage heat exchanger (45) is, for example, a fin and tube heat exchanger of the cross fin type, and a cold storage fan (47) which is a cooling fan is disposed near the cold storage heat exchanger (45).

In the present embodiment, the solenoid valve (7a) and a controller (control means) (80) which will be describe later make up an oil reclaim mechanism (7a, 80) for reclaiming refrigerating machine oil that has accumulated in the evaporator (45) and returning it to the compression mechanism (2D). The way of controlling the oil reclaim mechanism (7a, 80) will be described later in a concrete manner.

Freeze Unit

The freeze unit (1D) has a freezing heat exchanger (51) which is a cooling heat exchanger, a freezing expansion valve (52) which is an expansion mechanism, and a booster compressor (53) which is a freezing compressor. A branch liquid pipe (13) branched off from the first interunit liquid pipe (11) is connected, via the solenoid valve (7b) and the freezing expansion valve (52), to a liquid side of the freezing heat exchanger (51).

A gas side of the freezing heat exchanger (51) and a suction side of the booster compressor (53) are connected together by a connecting gas pipe (54). A branch gas pipe (16) branched off from the low pressure gas pipe (15) is connected to a discharge side of the booster compressor (53). The branch gas pipe (16) is provided with a check valve (7) and an oil separator (55). Connected between the oil separator (55) and the connecting gas pipe (54) is an oil return pipe (57) having a capillary tube (56).

The booster compressor (53) performs two-stage compression of refrigerant together with the compression mechanism (2D) of the first system so that the refrigerant evaporating temperature of the a freezing heat exchanger (51) is lower than the refrigerant evaporating temperature of the cold storage heat exchanger (45). The refrigerant evaporating temperature of the freezing heat exchanger (51) is set to, for example, −40 degrees Centigrade.

In addition, the freezing expansion valve (52) is a temperature sensitive expansion valve whose temperature sensing bulb is mounted on the gas side of the freezing heat exchanger (51). The freezing heat exchanger (51) is, for example, a fin and tube heat exchanger of the cross fin type, and a freezing fan (58) which is a cooling fan is disposed near the freezing heat exchanger (51).

In addition, a bypass pipe (59) having a check valve (7) is connected between the connecting gas pipe (54) which is a suction side of the booster compressor (53) and a downstream side of the check valve (7) of the branch gas pipe (16) which is a discharge side of the booster compressor (53). The bypass pipe (59) is constructed such that, when the booster compressor (53) is stopped by failure or the like, refrigerant flows, bypassing the booster compressor (53).

Control System

Various sensors and various switches are provided in the refrigerant circuit (1E). The high pressure gas pipe (8) of the outdoor unit (1A) is provided with a pressure sensor (61) for high pressure which is a pressure detecting means capable of detecting the pressure of high pressure refrigerant and a discharge temperature sensor (62) which is a temperature detecting means capable of detecting the temperature of high pressure refrigerant. The discharge pipe (5c) of the second non inverter compressor (2C) is provided with a discharge temperature sensor (63) which is a temperature detecting means capable of detecting the temperature of high pressure refrigerant. In addition, each of the discharge pipes (5a, 5b, 5c) of the compressors (2A, 2B, 2C) is provided with a pressure switch (64) which is placed in the opened position when the pressure of high pressure refrigerant becomes a predetermined value.

The suction pipes (6a, 6c) of the compressors (2A, 2C) are provided with pressure sensors (65, 66) for low pressure which are pressure detecting means capable of detecting the pressure of low pressure refrigerant and suction temperature sensors (67, 68) which are temperature detecting means capable of detecting the temperature of low pressure refrigerant.

The outdoor heat exchanger (4) is provided with an outdoor heat exchange sensor (69) which is a temperature detecting means capable of detecting the temperature of evaporation or condensation which is the temperature of refrigerant in the outdoor heat exchanger (4). In addition, the outdoor unit (1A) is provided with an outside air temperature sensor (70) which is a temperature detecting means capable of detecting the temperature of outside air.

The indoor heat exchanger (41) is provided with an indoor heat exchange sensor (71) which is a temperature detecting means capable of detecting the temperature of condensation or evaporation which is the temperature of refrigerant in the indoor heat exchanger (41). Disposed on the gas side of the indoor heat exchanger (41) is a gas temperature sensor (72) which is a temperature detecting means capable of detecting the temperature of gas refrigerant. In addition, the indoor unit (1B) is provided with a room temperature sensor (73) which is a temperature detecting means capable of detecting the temperature of indoor air.

The cold storage unit (1C) is provided with a cold storage temperature sensor (74) which is a temperature detecting means capable of detecting the inside temperature of a cold storage showcase. The freeze unit (1D) is provided with a freezing temperature sensor (75) which is a temperature detecting means capable of detecting the inside temperature of a freeze storage showcase. In addition, the pressure switch (64) which is placed in the opened position when the pressure of discharged refrigerant becomes a predetermined value is provided on the discharge side of the booster compressor (53).

Disposed between the shut off valve (20) and the check valve (7) in the second interunit liquid pipe (12) is a liquid temperature sensor (76) which is a temperature detecting means capable of detecting the temperature of refrigerant in the second interunit liquid pipe (12).

Output signals from the aforesaid various sensors and switches are fed to the controller (80). The controller (80) is so configured as to control operation of the refrigerant circuit (1E) and executes control by switching among eight different operation modes which will be described later. And, during operation, the controller (80) performs control on the activation, shut down, and displacement of the inverter compressor (2A), on the activation and shut down of the first and second non inverter compressors (2B, 2C), and on the valve travel adjustment of the outdoor and indoor expansion valves (26, 42). The controller (80) further performs control on the switching of the four way selector valves (3A, 3B, 3C) and on the switching of the solenoid valves (SV0, SV1, SV2, SV3, SV4, SV6) of the oil return pipes (31a, 31b), oil leveling pipes (32, 33, 34) and liquid injection pipe (27). Furthermore, the controller (80) further performs control of shutting off the solenoid valve (7a) of the cold storage unit (1C) and the solenoid valve (7b) of the freeze unit (1D) during the thermo off operation.

Furthermore, the controller (80) performs control on the switching of the solenoid valve (7a) at the time of reclaiming refrigerating machine oil that has accumulated in the cold storage heat exchanger (45) during operation and, at that time, performs such control that the displacement of the compression mechanism (2D) is adjusted. More specifically, during the oil reclaim operation, it is controlled such by the controller (80) that the refrigerating apparatus is operated with the solenoid valve (7a) placed once in the closed position for a predetermined length of time, thereby increasing the degree of superheat at the outlet of the evaporator (45) to force the cold storage expansion valve (46) to be opened a little more than usual, after which the solenoid valve (7a) is placed in the opened position so as to cause liquid refrigerant to flow, at rapid rate, into the cold storage heat exchanger (45). As a result, refrigerating machine oil in the inside of the cold storage heat exchanger (45) is reclaimed and returned to the compression mechanism (2D) of the first system. Details of this oil reclaim operation will be described later.

Running Operation

Hereinafter, running operations of the refrigerating apparatus (1) will be described for each mode of operation. In the present embodiment, for example, eight different operation modes can be set. More specifically, 1) a cooling mode of operation in which only the cooling operation of the indoor unit (1B) is carried out; 2) a freezing mode of operation in which only the cooling operation of the cold storage and freeze units (1C, 1D) is carried out; 3) a first cooling/freezing mode of operation in which the cooling operation of the indoor unit (1B) is carried out simultaneously with the cooling operation of the cold storage and freeze units (1C, 1D); 4) a second cooling/freezing mode of operation which is a mode of operation when the cooling capacity of the indoor unit (1B) becomes insufficient in the first cooling/freezing operation mode; 5) a heating mode of operation in which only the heating operation of the indoor unit (1B) is carried out; 6) a first heating/freezing mode of operation in which the heating operation of the indoor unit (1B) and the cooling operation of the cold storage and freeze units (1C, 1D) are carried out in a heat recovery operation without using the outdoor heat exchanger (4); 7) a second heating/freezing mode of operation which is a heating capacity surplus mode of operation in which the heating capacity of the indoor unit (1B) becomes surplus in the first heating/ freezing operation mode; and 8) a third heating/freezing mode of operation which is a heating capacity insufficient mode operation in which the heating capacity of the indoor unit (1B) becomes insufficient in the first heating/freezing operation mode.

Hereinafter, each mode of operation will be described more specifically.

Cooling Mode of Operation

In this cooling operation mode, only the cooling operation of the indoor unit (1B) is carried out. During the cooling operation mode, as can be seen from FIG. 2, the inverter compressor (2A) constitutes the compression mechanism (2D) of the first system, while the first non inverter compressor (2B) and the second non inverter compressor (2C) together make up the compression mechanism (2E) of the second system. And, only the first non inverter compressor (2B) and the second non inverter compressor (2C) which constitute the compression mechanism (2E) of the second system are activated.

Figure 2:
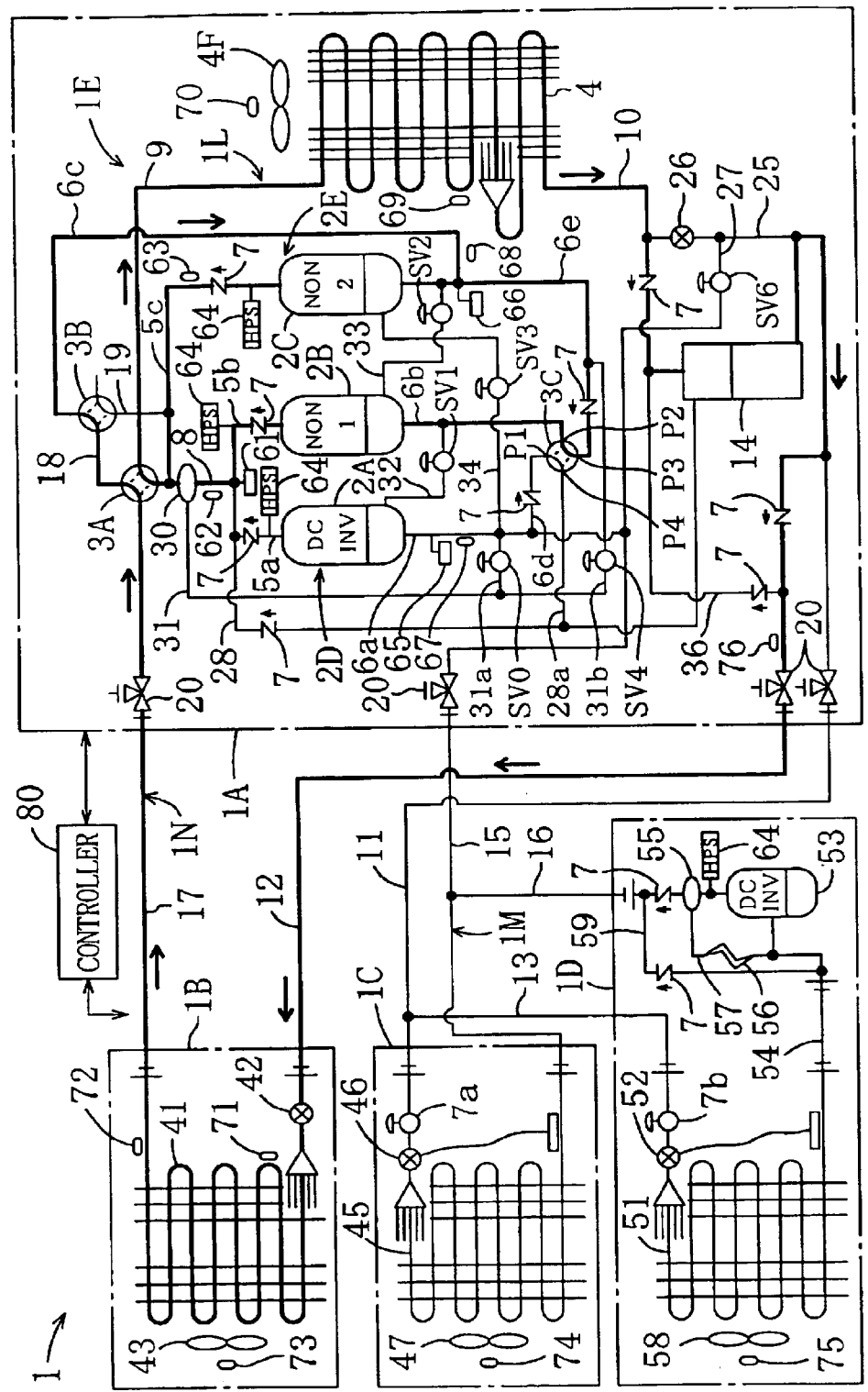
FIG. 2 is a refrigerant circuit diagram showing an operation in a cooling mode.

In addition, as indicated by the solid lines in FIG. 2, both the first four way selector valve (3A) and the second four way selector valve (3B) are switched to the first state, while the third four way selector valve (3C) is switched to the second state. In addition, the outdoor expansion valve (26), the solenoid valve (7a) of the cold storage unit (1C), and the solenoid valve (7b) of the freeze unit (1D) are all placed in the closed position.

In this state, refrigerants, discharged from the first non inverter compressor (2B) and from the second non inverter compressor (2C), flow into the outdoor heat exchanger (4) from the first four way selector valve (3A) by way of the outdoor gas pipe (9), and condense to a liquid. This liquid refrigerant flows in the liquid pipe (10), passes through the receiver (14), flows in the second interunit liquid pipe (12), flows into the indoor heat. exchanger (41) by way of the indoor expansion valve (42), and evaporates to a gas. This gas refrigerant flows in the interunit gas pipe (17), passes through the first and second four way selector valves (3A, 3B), and flows in the suction pipe (6c) of the second non inverter compressor (2C). Part of this low pressure gas refrigerant is brought back to the second non inverter compressor (2C), while the other part of the gas refrigerant branches off into the branch pipe (6e) from the suction pipe (6c) of the second non inverter compressor (2C), and is returned to the first non inverter compressor (2B) by way of the third four way selector valve (3C). The inside of the store is cooled by repetition of the above-described refrigerant circulation.

In this mode of operation, the activating and stopping of the first and second non inverter compressors (2B, 2C) and the valve travel of the indoor expansion valve (42) are controlled according to the room cooling load. It is possible to operate only one of the compressors (2B, 2C).

Freezing Mode of Operation

The freezing operation mode is an operation mode in which only the cooling operation of the cold storage and freeze units (1C, 1D) is carried out. In this freezing operation mode, as can be seen from FIG. 3, the inverter compressor (2A) and the first non inverter compressor (2B) together make up the compression mechanism (2D) of the first system, while the second non inverter compressor (2C) constitutes the compression mechanism (2E) of the second system. And, the inverter compressor (2A) and the first non inverter compressor (2B) together constituting the compression mechanism (2D) of the first system are activated and, at the same time, the booster compressor (53) is also activated. On the other hand, the second non inverter compressor (2C) remains at rest.

Figure 3:
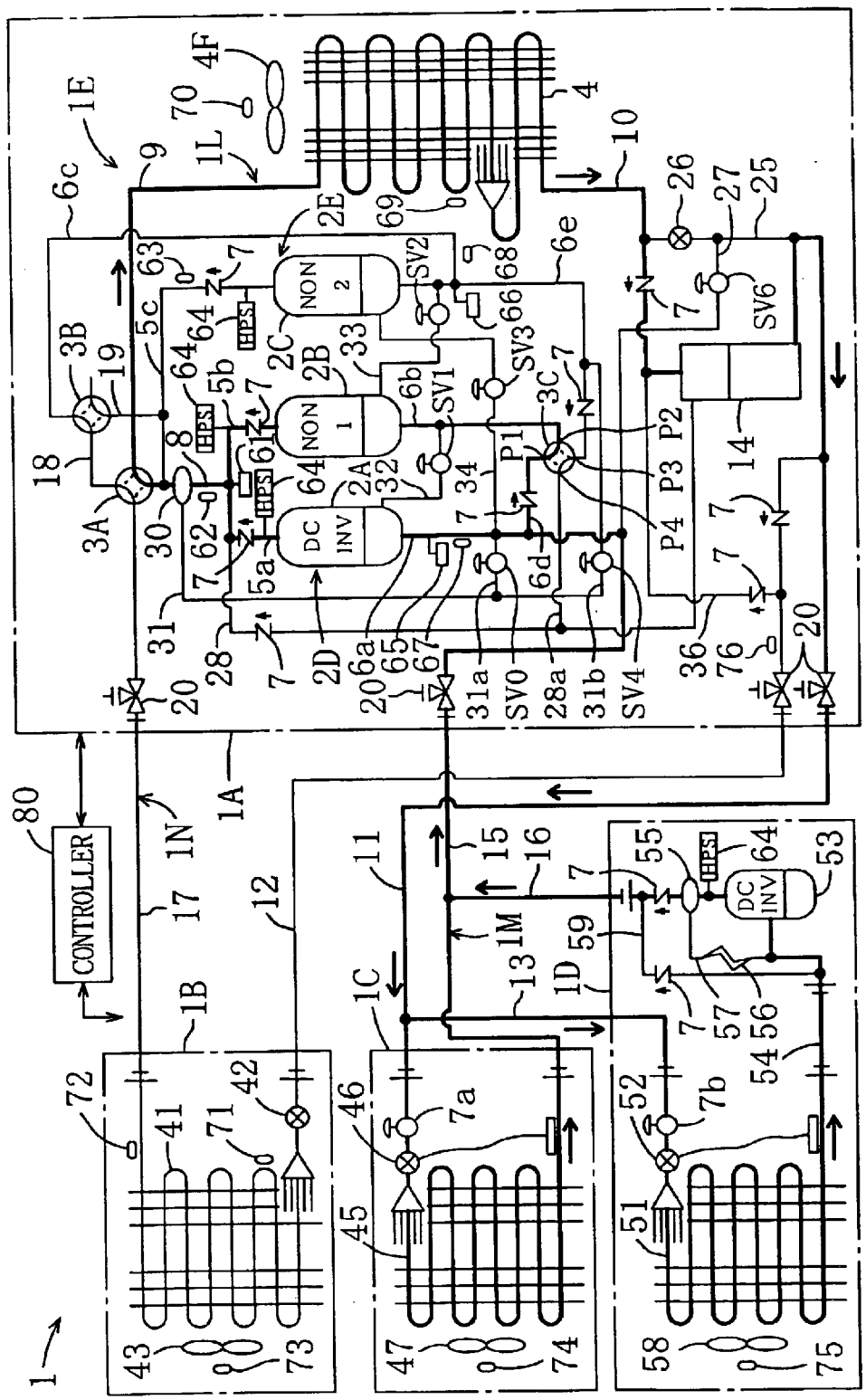
FIG. 3 is a refrigerant circuit diagram showing an operation in a freezing mode.

Additionally, as indicated by the solid lines in FIG. 3, the first four way selector valve (3A) and the second four way selector valve (3B) are switched to the first state, and the third four way selector valve (3C) is also switched to the first state. Furthermore, the solenoid valve (7a) of the cold storage unit (1C) and the solenoid valve (7b) of the freeze unit (1D) are placed in the opened position, while on the other hand the outdoor expansion valve (26) and the indoor expansion valve (42) are placed in the closed position.

In this state, refrigerants, discharged from the inverter compressor (2A) and from the first non inverter compressor (2B), flow through the first four way selector valve (3A), pass through the outdoor gas pipe (9), flow into the outdoor heat exchanger (4), and condense to a liquid. This liquid refrigerant flows in the liquid pipe (10), passes through the receiver (14), and flows in the first interunit liquid pipe (11), wherein part of the liquid refrigerant passes through the cold storage expansion valve (46), flows into the cold storage heat exchanger (45), and evaporates.

Meanwhile, the other liquid refrigerant flowing in the first interunit liquid pipe (11) flows in the branch liquid pipe (13), passes through the refrigeration expansion valve (52), flows into the refrigeration heat exchanger (51), and evaporates to a gas. This gas refrigerant, evaporated in the refrigeration heat exchanger (51), is drawn into the booster compressor (53) and is compressed there, and is discharged to the branch gas pipe (16).

The gas refrigerant evaporated in the cold storage heat exchanger (45) and the gas refrigerant discharged out of the booster compressor (53) merge in the low pressure gas pipe (15). The merged refrigerant is returned to the inverter compressor (2A) and to the first non inverter compressor (2B). By repetition of the above-described refrigerant circulation, the inside of the cold storage showcase and the inside of the freeze storage showcase are cooled.

The pressure of refrigerant in the refrigeration heat exchanger (51) becomes lower than the pressure of refrigerant in the cold storage heat exchanger (45), for the former refrigerant is drawn into the booster compressor (53). As the result of this, for example, the temperature of refrigerant (the temperature of evaporation) in the refrigeration heat exchanger (51) is –40 degrees Centigrade and the temperature of refrigerant (the temperature of evaporation) in the cold storage heat exchanger (45) is –10 degrees Centigrade.

During the refrigeration mode of operation, for example, the activating and stopping of the first non inverter compressor (2B) and the activating, stopping, and displacement of the inverter compressor (2A) are controlled based on a low-pressure-refrigerant pressure (LP) detected by the pressure sensor (65) for low pressure, and the refrigerating apparatus is operated according to the refrigeration load.

For example, for the case of controlling the displacement of the compression mechanism (2D) to increase, firstly the inverter compressor (2A) is activated with the inverter compressor (2A) remaining at rest. If, after the displacement of the inverter compressor (2A) is increased to a maximum, the load further increases, the displacement of the inverter compressor (2A) is reduced to a minimum at the same time that the first non inverter compressor (2B) is activated. If the load increases to a further extent, the displacement of the inverter compressor (2A) is increased with the first non inverter compressor (2B) remaining activated. In the control of decreasing the compressor displacement, reverse operations to those in the increasing control are carried out.

In addition, with respect to the valve travel of each of the cold storage expansion valve (46) and the refrigeration expansion valve (52), control operations based on the degree of superheat are carried out by means of a temperature sensing bulb, which is applied, in the same way, to each of the following operation modes.

First Cooling/Freezing Mode of Operation

The first cooling/freezing operation mode is an operation mode in which the cooling operation of the indoor unit (1B) and the cooling operation of each of the cold storage unit (1C) and the freeze unit (1D) are carried out at the same time. In the first cooling/freezing operation mode, as can be seen from FIG. 4, the inverter compressor (2A) and the first non inverter compressor (2B) together make up the compression mechanism (2D) of the first system, while the second non inverter compressor (2C) constitutes the compression mechanism (2E) of the second system. And, the inverter compressor (2A), the first non inverter compressor (2B), and the second non inverter compressor (2C) are activated and the booster compressor (53) is also activated.

Figure 4:
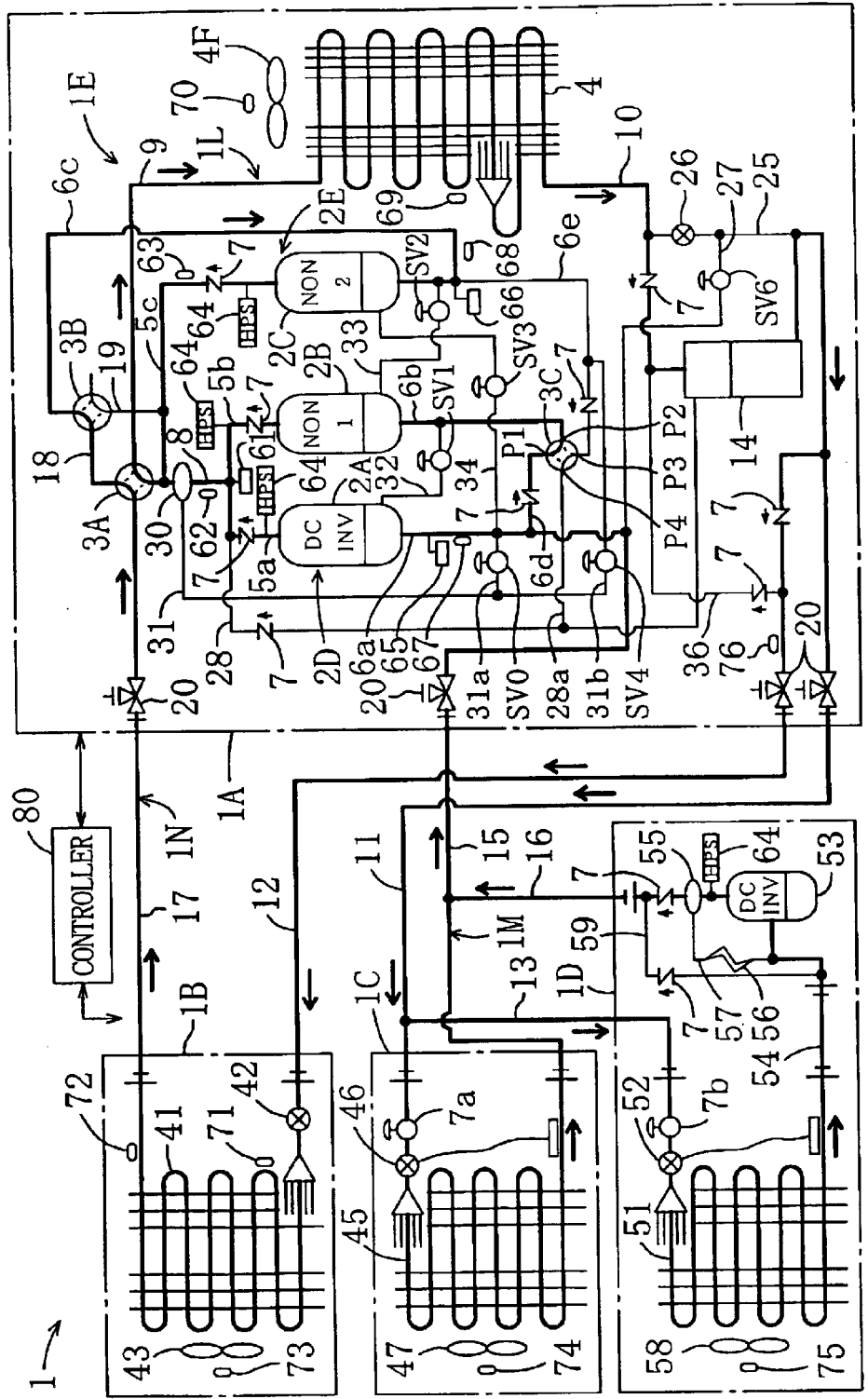
FIG. 4 is a refrigerant circuit diagram showing an operation in a first cooling/freezing mode.

Furthermore, as indicated by the solid lines in FIG. 4, the first four way selector valve (3A), the second four way selector valve (3B), and the third four way selector valve (3C) are switched to the first state. Further, the solenoid valve (7a) of the cold storage unit (1C) and the solenoid valve (7b) of the freeze unit (1D) are placed in the opened position, while the outdoor expansion valve (26) is placed in the closed position.

In this sate, refrigerants, discharged from the inverter compressor (2A), the first non inverter compressor (2B), and the second non inverter compressor (2C), merge in the high pressure gas pipe (8). The merged refrigerant flows through the first four way selector valve (3A), passes through the outdoor gas pipe (9), flows into the outdoor heat exchanger (4), and condenses to a liquid. This liquid refrigerant flows in the liquid pipe (10), passes through the receiver (14), and is branched off to flow in the first interunit liquid pipe (11) and in the second interunit liquid pipe (12).

The liquid refrigerant flowing in the second interunit liquid pipe (12) passes through the indoor expansion valve (42), flows into the indoor heat exchanger (41), and evaporates to a gas. This gas refrigerant flows in the interunit gas pipe (17), passes through the first and second four way selector valves (3A, 3B), flows in the suction pipe (6c), and returns to the second non inverter compressor (2C).

Meanwhile, a part of the liquid refrigerant flowing in the first interunit liquid pipe (11) flows into the cold storage heat exchanger (45) by way of the cold storage expansion valve (46) and evaporates to a gas. In addition, the other liquid refrigerant flowing in the first interunit liquid pipe (11) flows in the branch liquid pipe (13), passes through the refrigeration expansion valve (52), flows into the freezing heat exchanger (51), and evaporates to a gas. This gas refrigerant, evaporated in the freezing heat exchanger (51), is drawn into the booster compressor (53) for compression. The compressed refrigerant is discharged to the branch gas pipe (16).

The gas refrigerant evaporated in the cold storage heat exchanger (45) and the gas refrigerant discharged out of the booster compressor (53) merge in the low pressure gas pipe (15). The merged gas refrigerant is returned to the inverter compressor (2A) and to the first non inverter compressor (2B).

By the refrigerant being circulated repeatedly as described hereinabove, the inside of the store is cooled and, at the same time, the inside of the cold storage showcase and the inside of the freeze storage showcase are cooled.

Second Cooling/Freezing Mode of Operation

Figure 5:
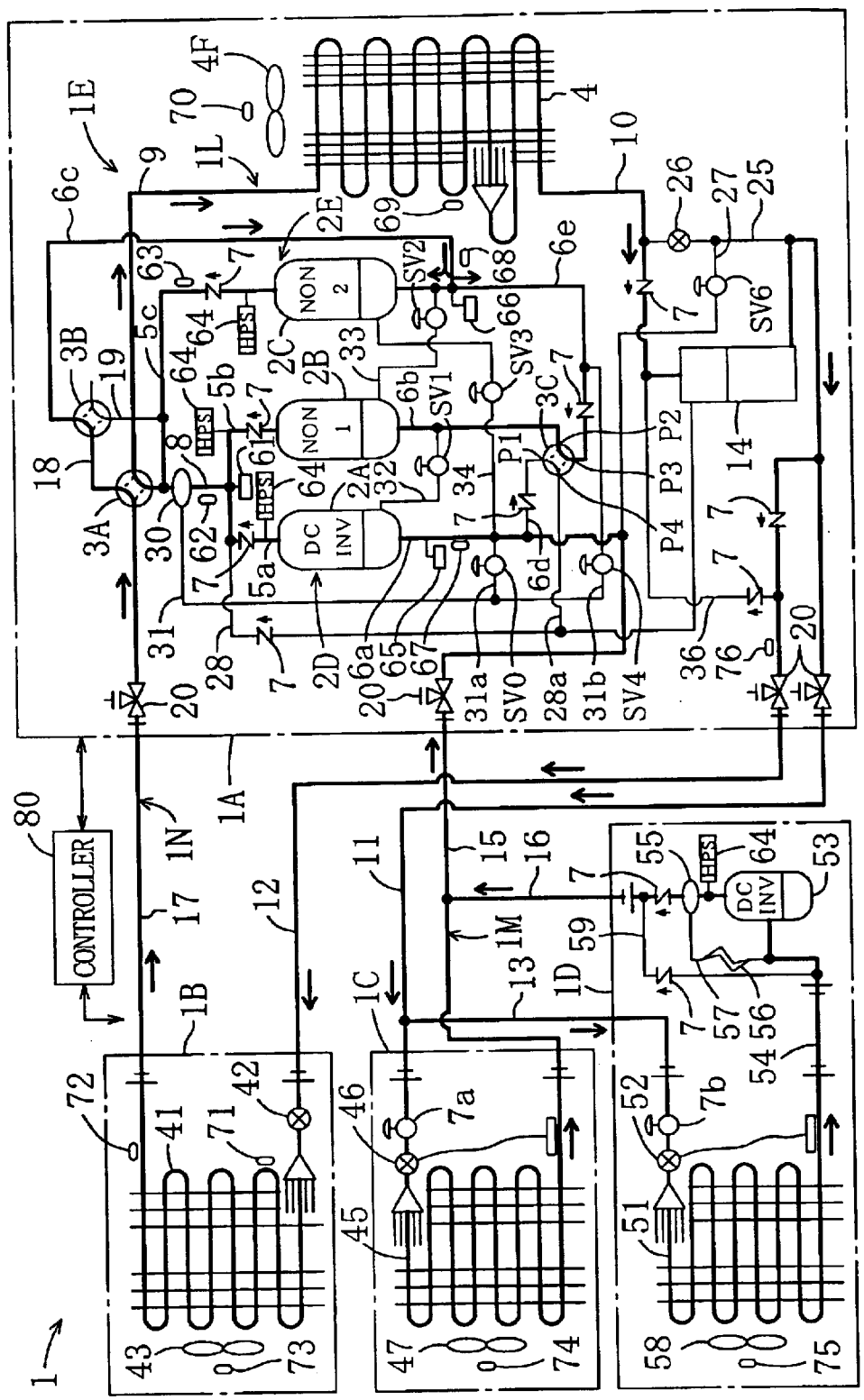
FIG. 5 is a refrigerant circuit diagram showing an operation in a second cooling/freezing mode.

The second cooling/freezing operation mode is an operation mode in which the cooling capacity of the indoor unit (1B) becomes insufficient in the first cooling/refrigeration operation mode, i.e., the second cooling/refrigeration operation mode is an operation mode in which the first non inverter compressor (2B) is switched to the air conditioning side. As shown in FIG. 5, the setting of the second cooling/refrigeration operation mode is basically the same as the setting of the first cooling/refrigeration operation mode, with the exception that the third four way selector valve (3C) is switched to the second state.

Accordingly, during the second cooling/refrigeration operation mode, refrigerants, discharged from the inverter compressor (2A), the first non inverter compressor (2B), and the second non inverter compressor (2C), condense in the outdoor heat exchanger (4) and evaporate in the indoor heat exchanger (41), the cold storage heat exchanger (45), and the refrigeration heat exchanger (51), as in the first cooling/refrigeration operation mode.

And, the refrigerant evaporated in the indoor heat exchanger (41) is brought back to the first non inverter compressor (2B) and to the second non inverter compressor (2C), while the refrigerant, evaporated in each of the cold storage heat exchanger (45) and the refrigeration heat exchanger (51), is brought back to the inverter compressor (2A). The lack of cooling capacity is compensated by using the two compressors (2B, 2C) for the air conditioning side.

The concrete description of controlling switching between the first cooling/refrigeration operation mode and the second cooling/refrigeration operation mode is omitted here.

Heating Mode of Operation

This heating operation mode is an operation mode in which only the heating operation of the indoor unit (1B) is carried out. In the heating operation mode, as can be seen from FIG. 6, the inverter compressor (2A) constitutes the compression mechanism (2D) of the first system, while the first non inverter compressor (2B) and the second non inverter compressor (2C) together make up the compression mechanism (2E) of the second channel. And, only the first and second non inverter compressors (2B, 2C) together constituting the compression mechanism (2E) of the second channel are activated.

Figure 6:
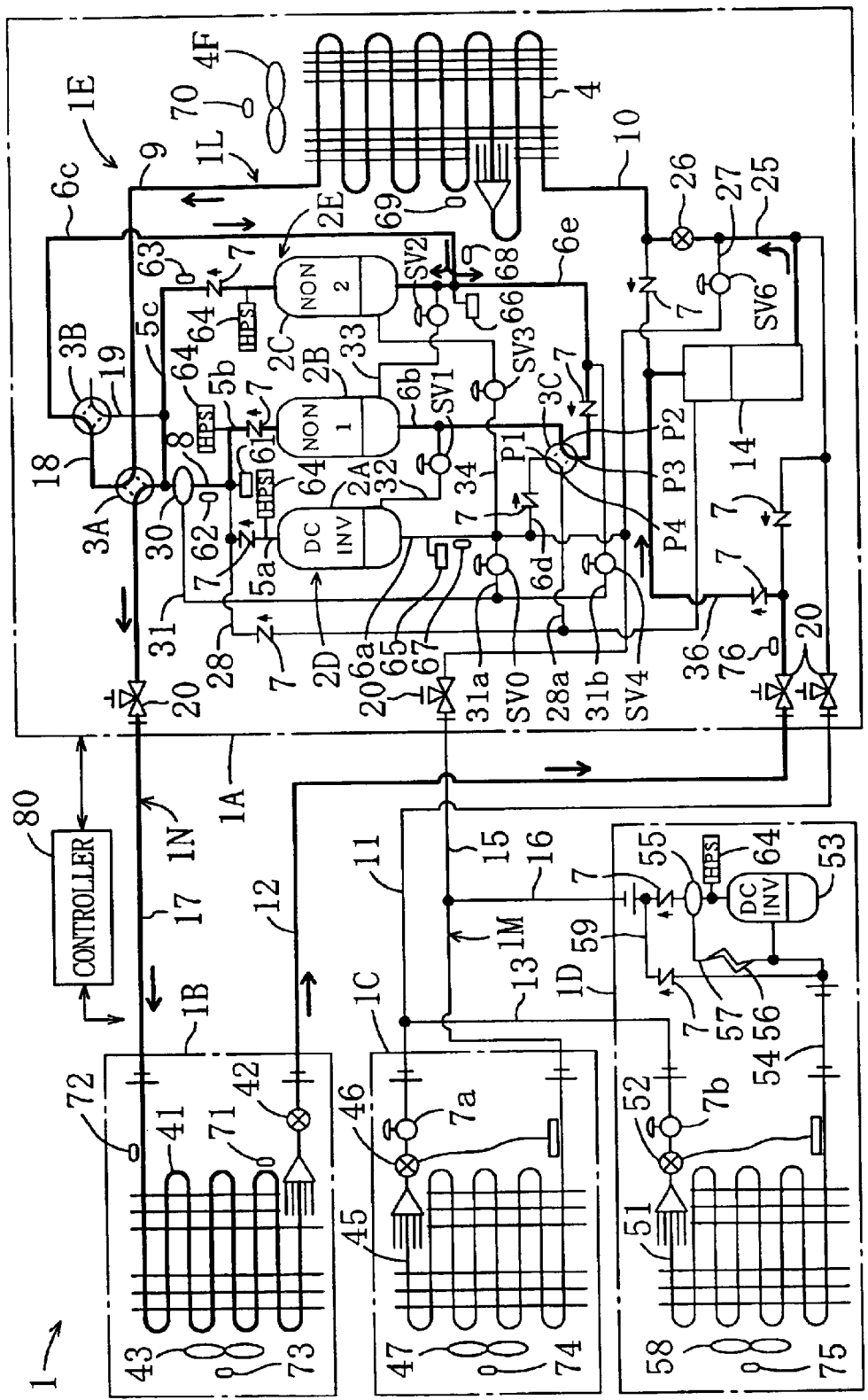
FIG. 6 is a refrigerant circuit diagram showing an operation in a heating mode.

In addition, as shown in the solid lines in FIG. 6, the first four way selector valve (3A) is switched to the second state, the second four way selector valve (3B) is switched to the first state, and the third four way selector valve (3C) is switched to the second state. Meanwhile, the solenoid valve (7a) of the cold storage unit (1C) and the solenoid valve (7b) of the freeze unit (1D) are placed in the closed position.

Furthermore, the valve travel of the outdoor expansion valve (26) is degree-of-superheat controlled according to the pressure equivalent saturation temperature based on the pressure sensor (66) for low pressure and according to the temperature detected by the suction temperature sensor (68). The valve travel of the indoor expansion valve (42) is supercooling controlled based on the temperature detected by the indoor heat exchange sensor (71) and based on the temperature detected by the liquid temperature sensor (76). Hereinafter, the controlling of the valve travel of the outdoor and indoor expansion valves (26, 42) is the same as in the heating mode of operation.

In the above state, refrigerants, discharged from the first and second non inverter compressors (2B, 2C), flow into the indoor heat exchanger (41) from the first four way selector valve (3A) by way of the interunit gas pipe (17) and condense to a liquid. This liquid refrigerant flows in the second interunit liquid pipe (12) and enters into the receiver (14) via the branch liquid pipe (36). Thereafter, the liquid refrigerant passes through the outdoor expansion valve (26) of the auxiliary liquid pipe (25), flows into the outdoor heat exchanger (4), and evaporates to a gas. This gas refrigerant flows to the suction pipe (6c) of the second non inverter compressor (2C) from the outdoor gas pipe (9) by way of the first and second four way selector valves (3A, 3B), and is brought back to the first non inverter compressor (2B) and to the second non inverter compressor (2C). This refrigerant circulation is repeatedly carried out, and the room is heated.

Like the cooling operation mode, the heating operation mode can be carried out using a single compressor, i.e., one of the compressors (2B, 2C).

First Heating/Freezing Mode of Operation

This first heating/freezing operation mode is a heat recovery operation mode in which the heating operation of the indoor unit (1B) and the cooling operation of the cold storage unit (1C) and freeze unit (1D) are carried out without the use of the outdoor heat exchanger (4). In the first heating/freezing operation mode, as can be seen from FIG. 7, the inverter compressor (2A) and the first non inverter compressor (2B) together make up the compression mechanism (2D) of the first system, while the second non inverter compressor (2C) constitutes the compression mechanism (2E) of the second system. And, the inverter compressor (2A) and the first non inverter compressor (2B) are activated and, at the same time, the booster compressor (53) is also activated. The second non inverter compressor (2C) remains at rest.

Figure 7:
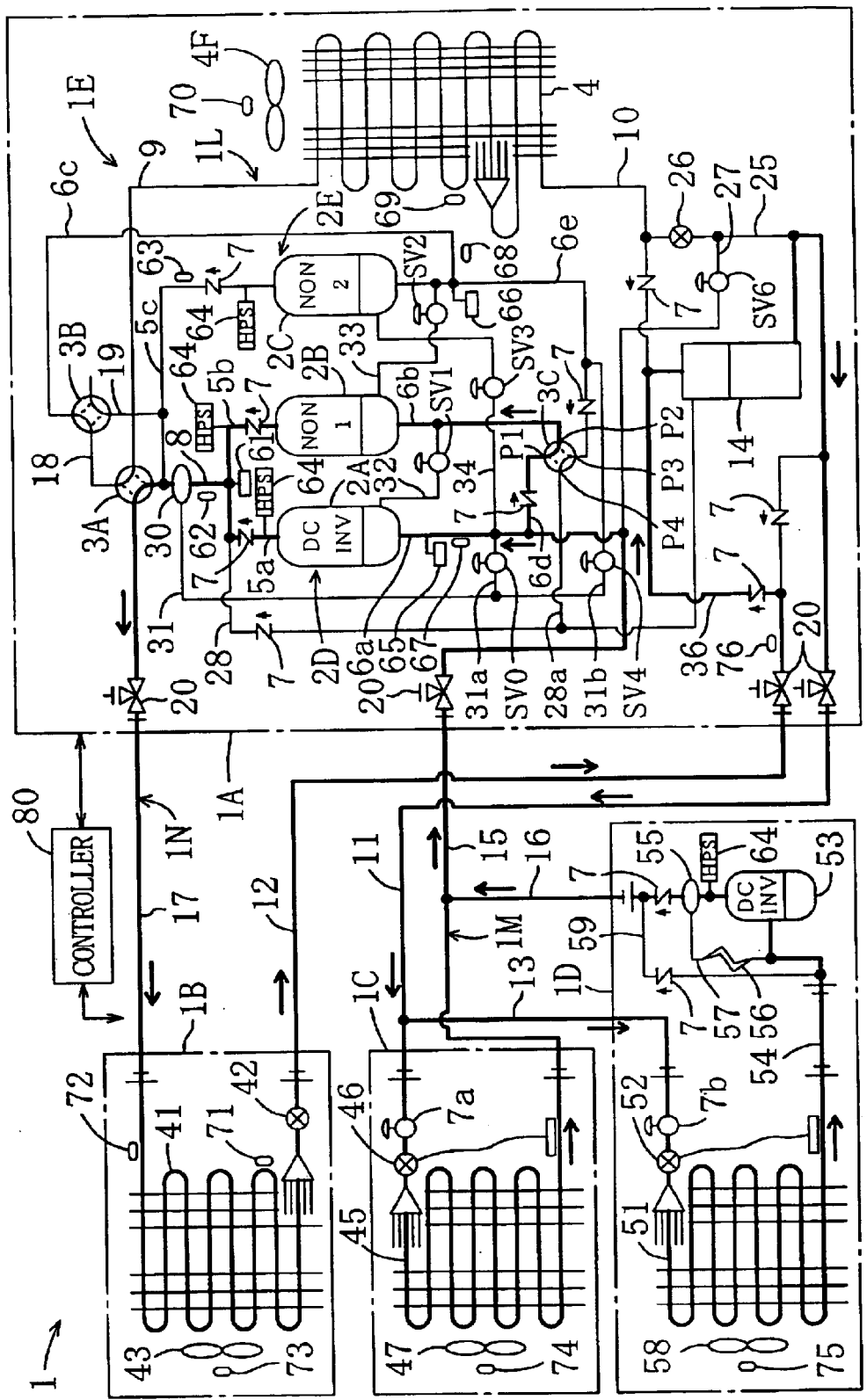
FIG. 7 is a refrigerant circuit diagram showing an operation in a first heating/freezing mode.

Additionally, as indicated by the solid lines in FIG. 7, the first four way selector valve (3A) is switched to the second state, while the second and third four way selector valves (3B, 3C) are switched to the first state. Furthermore, the solenoid valve (7a) of the cold storage unit (1C) and the solenoid valve (7b) of the freeze unit (1D) are placed in the opened position, while on the other hand the outdoor expansion valve (26) is placed in the closed position.

In the state described above, refrigerants, discharged from the inverter compressor (2A) and from the first non inverter compressor (2B), flow into the indoor heat exchanger (41) from the first four way selector valve (3A) via the interunit gas pipe (17) and condense to a liquid. This liquid refrigerant flows in the first interunit liquid pipe (11) from the second interunit liquid pipe (12) via the receiver (14).

A part of the liquid refrigerant flowing in the first interunit liquid pipe (11) flows into the cold storage heat exchanger (45) via the cold storage expansion valve (46) and evaporates. Furthermore, the other liquid refrigerant flowing in the first interunit liquid pipe (11) flows in the branch liquid pipe (13), flows into the refrigeration heat exchanger (51) via the refrigeration expansion valve (52), and evaporates to a gas. This gas liquid evaporated in the refrigeration heat exchanger (51) is drawn into the booster compressor (53) for compression. And, the compressed refrigerant is discharged to the branch gas pipe (16).

The gas refrigerant evaporated in the cold storage heat exchanger (45) and the gas refrigerant discharged out of the booster compressor (53) merge in the low pressure gas pipe (15). The merged gas refrigerant is brought back to the inverter compressor (2A) and to the first non inverter compressor (2B). By repetition of this circulation, the inside of the store is heated and, at the same time, the inside of the cold and freeze storage showcases is cooled. Stated another way, the cooling capacity (the amount of heat of evaporation) of the cold storage unit (1C) and freeze unit (1D) is in a balanced relationship with the heating capacity (the amount of heat of condensation) of the indoor unit (1B), thereby achieving a 100% heat recovery.

Second Heating/Freezing Mode of Operation

Figure 8:
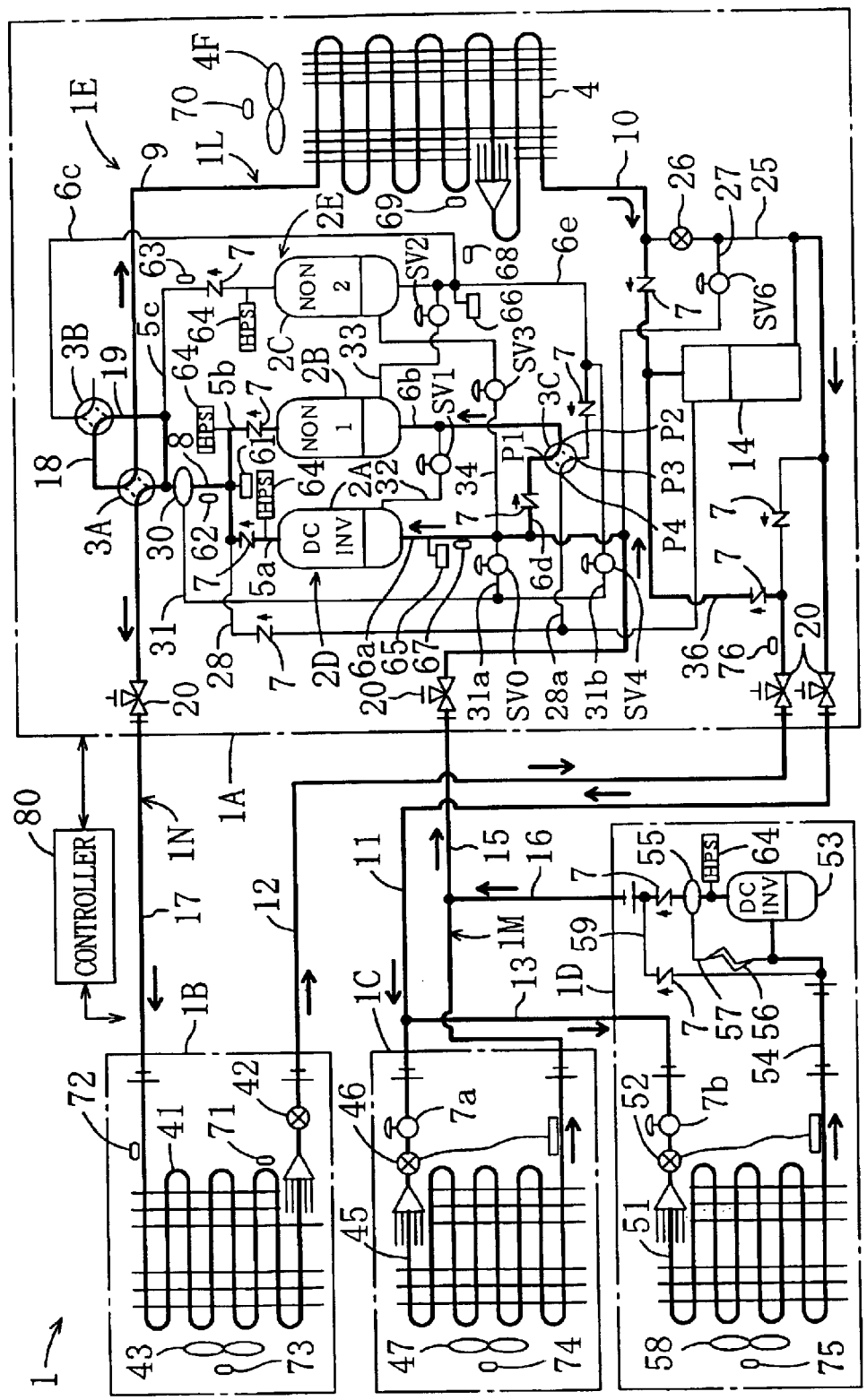
FIG. 8 is a refrigerant circuit diagram showing an operation in a second heating/freezing mode.

This second heating/freezing operation mode is a heating capacity surplus operation mode in which the heating capacity of the indoor unit (1B) is in surplus in the first heating/freezing operation mode. In the second heading/freezing operation mode, as can be seen from FIG. 8, the inverter compressor (2A) and the first non inverter compressor (2B) together make up the compression mechanism (2D) of the first system while the second non inverter compressor (2C) constitutes the compression mechanism (2E) of the second system. And, the inverter compressor (2A) and the first non inverter compressor (2B) are activated, while at the same time the booster compressor (53) is also activated. The second non inverter compressor (2C) remains at rest.

The second heating/freezing operation mode is an operation mode in which the heating capacity of the indoor unit (1B) is in surplus in the first heating/freezing operation mode. And, as indicated by the solid lines in FIG. 8, the second heating/freezing operation mode is the same as the first heating/freezing operation mode, with the exception that the second four way selector valve (3B) is switched to the second state.

Accordingly, parts of the refrigerants discharged from the inverter compressor (2A) and from the first non inverter compressor (2B) flow into the indoor heat exchanger (41), as in the first heating/freezing operation mode, and condense to a liquid. This liquid refrigerant flows into the receiver (14) from the second interunit liquid pipe (12) by way of the branch liquid pipe (36), and then flows in the first interunit liquid pipe (11).

Meanwhile, the other refrigerants, discharged from the inverter compressor (2A) and from the first non inverter compressor (2B), flow in the auxiliary gas pipe (19), pass through the second four way selector valve (3B) and then through the first four way selector valve (3A), flow in the outdoor gas pipe (9), and condense to a liquid in the outdoor heat exchanger (4). This liquid refrigerant flows in the liquid pipe (10) and merges with the liquid refrigerant from the second interunit liquid pipe (12), and the merged liquid refrigerant flows in the first interunit liquid pipe (11).

Thereafter, a part of the liquid refrigerant flowing in the first interunit liquid pipe (11) flows into the cold storage heat exchanger (45) and evaporates to a gas. On the other hand, the other liquid refrigerant flowing in the first interunit liquid pipe (11) flows into the freezing heat exchanger (51) and evaporates to a gas. This gas refrigerant is drawn into the booster compressor (53). The gas refrigerant evaporated in the cold storage heat exchanger (45) and the gas refrigerant discharged out of the booster compressor (53) merge in the low pressure gas pipe (15). The merged refrigerant is brought back to the inverter compressor (2A) and to the first non inverter compressor (2B). By repletion of such refrigerant circulation, the inside of the store is heated while at the same time cooling the inside of the cold and freeze storage showcases. In other words, the cooling capacity (the amount of heat of evaporation) of the cold storage unit (1C) and freeze unit (1D) is not in a balanced relationship with the heating capacity (the amount of heat of condensation) of the indoor unit (1B), and surplus heat of condensation is discharged outdoors in the outdoor heat exchanger (4).

Third Heating/Freezing Mode of Operation

Figure 9:
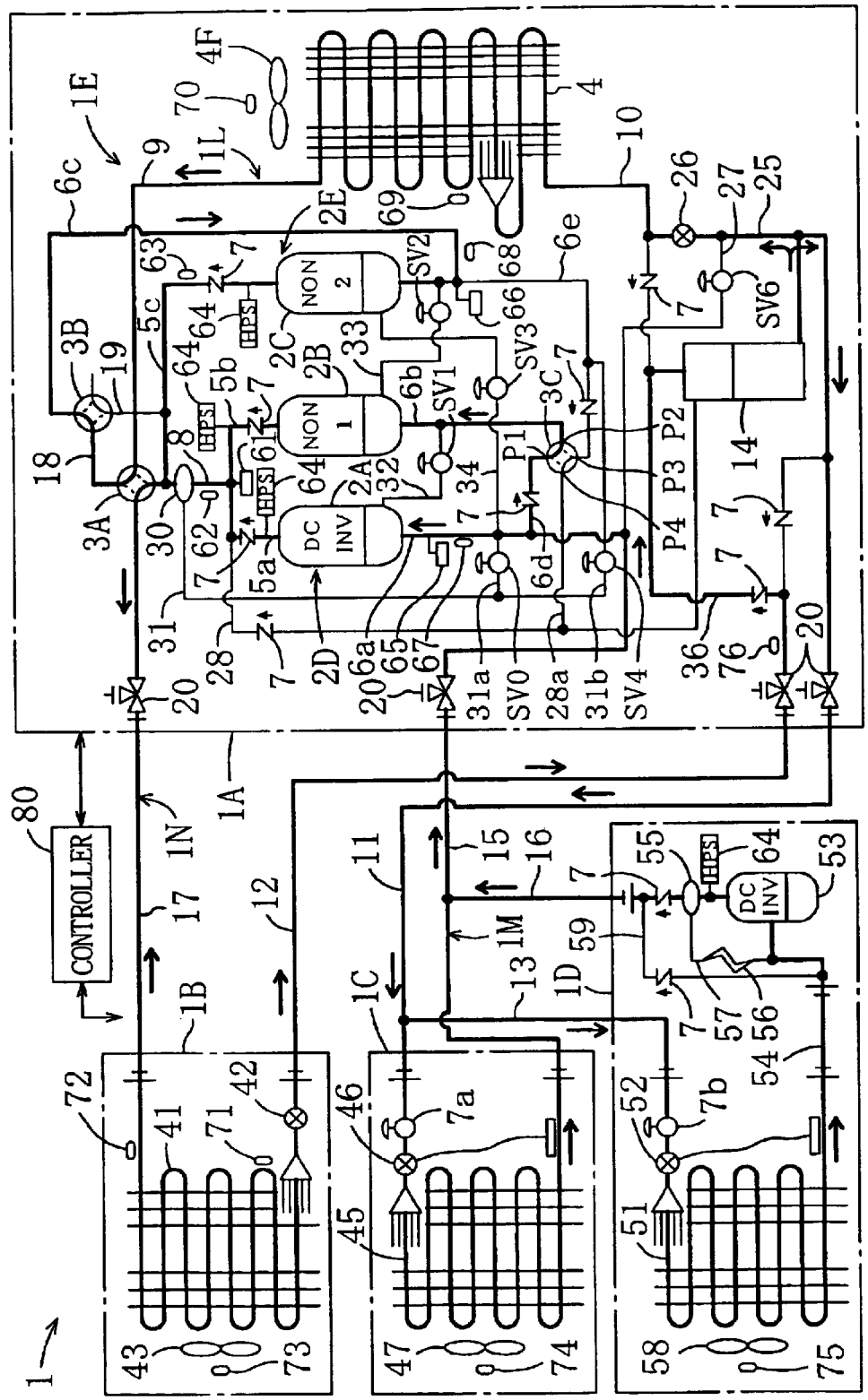
FIG. 9 is a refrigerant circuit diagram showing an operation in a third heating/freezing mode.

This third heating/freezing operation mode is a heating capacity deficiency operation mode in which the indoor unit (1B) is deficient in heating capacity in the first heating/freezing operation mode. In the third heating/freezing operation mode, as can be seen from FIG. 9, the inverter compressor (2A) and the first non inverter compressor (2B) together make up the compression mechanism (2D) of the first system, while the second non inverter compressor (2C) constitutes the compression mechanism (2E) of the second system. And, the inverter compressor (2A), the first non inverter compressor (2B), and the second non inverter compressor (2C) are activated and, at the same time, the booster compressor (53) is also made active.

The third heating/freezing operation mode is an operation mode in which the indoor unit (1B) becomes deficient in its heating capacity in the first heating/freezing operation mode, in other words the amount of heat of evaporation is insufficient. The third heating/freezing operation mode is the same as the first heating/freezing operation mode, with the exception that the valve travel of the outdoor expansion valve (26) is controlled and the second non inverter compressor (2C) is activated.

Accordingly, refrigerants, discharged from the inverter compressor (2A), from the first non inverter compressor (2B), from the second non inverter compressor (2C), pass through the interunit gas pipe (17), flow into the indoor heat exchanger (41), and condense to a liquid, as in the first heating/refrigeration operation mode. This liquid refrigerant flows into the receiver (14) from the second interunit liquid pipe (12) via the branch liquid pipe (36).

Thereafter, a part of the liquid refrigerant from the receiver (14) flows in the first interunit liquid pipe (11) and a part of the liquid refrigerant flowing in the first interunit liquid pipe (11) flows into the cold storage heat exchanger (45) and evaporates to a gas. On the other hand, the other refrigerant flowing in the first interunit liquid pipe (11) flows into the refrigeration heat exchanger (51) and evaporates to a gas. And, this gas refrigerant is drawn into the booster compressor (53). The gas refrigerant evaporated in the cold storage heat exchanger (45) and the gas refrigerant discharged out of the booster compressor (53) merge in the low pressure gas pipe (15). This merged refrigerant is brought back to the inverter compressor (2A) and to the first non inverter compressor (2B).

Meanwhile, the other refrigerant from the receiver (14) flows into the outdoor heat exchanger (4) by way of the liquid pipe (10) and evaporates to a gas. This gas refrigerant flows in the outdoor gas pipe (9), passes through the first four way selector valve (3A) and then through the second four way selector valve (3B), flows in the suction pipe (6c) of the second non inverter compressor (2C), and is brought back to the second non inverter compressor (2C).

By repetition of such refrigerant circulation, the inside of the store is heated while at the same time cooling the inside of the cold and freeze storage showcases. Stated another way, the cooling capacity (the amount of heat of evaporation) of the cold storage unit (1C) and freeze unit (1D) is not in a balanced relationship with the heating capacity (the amount of heat of condensation) of the indoor unit (1B), and the outdoor heat exchanger (4) supplies a deficiency in heat of evaporation.

Oil Reclaim Operation

In each of the above-described operation modes, refrigerating machine oil contained in the refrigerant discharged from each compressor is separated therefrom in the oil separator (30). And, by adequately opening and shutting off the solenoid valves (SV0–SV4) according to the operational status, the reclaiming and returning of refrigerating machine oil to the compressors (2A, 2B, 2C) from the oil separator (30) is carried out.

On the other hand, when refrigerating machine oil accumulates in the indoor heat exchanger (41) which operates as an evaporator during the cooling mode of operation, a large amount of liquid refrigerant is forced to flow into the indoor heat exchanger (41) by opening the indoor expansion valve (42) a little more than usual, whereby the refrigerating machine oil that has accumulated inside the indoor heat exchanger (41) is reclaimed and returned to the compressors (2B, 2C), together with the refrigerant.

In addition, the booster compressor (53) is connected directly to the gas side of the freezing heat exchanger (51), thereby allowing refrigerant to be drawn into the booster compressor (53) at a sufficiently high flow rate. As the result of this, refrigerating machine oil will hardly accumulate in the inside of the freezing heat exchanger (51). Accordingly, in the present embodiment, no particular oil reclaim operation is performed on the freezing heat exchanger (51).

Contrary to the above, in the present embodiment, the three cold storage units (1C) are connected to the single outdoor unit (1A), and refrigerating machine oil is likely to accumulate in the inside of each of the cold storage heat exchangers (45) because refrigerant is sucked in from the cold storage heat exchangers (45) by the single compression mechanism (2D). To cope with this, the reclaiming and returning of oil is carried out by operating the solenoid valve (7a) with the controller (80). This oil reclaim operation is carried out at the same time for every cold storage showcase.

Oil reclaim operations are carried out according to the flowcharts of FIGS. 10–14. In these flowcharts, the inverter compressor (2A) is represented by DC or DC COMPRESSOR, and the first non inverter compressor (2B) is represented by NON or NON COMPRESSOR.

The oil reclaim operation is carried out in different four patterns depending on the compressor operational status. The flowchart of FIG. 10 shows a procedure of selecting a suitable oil reclaim operation for a compressor operational status.

Figure 10:
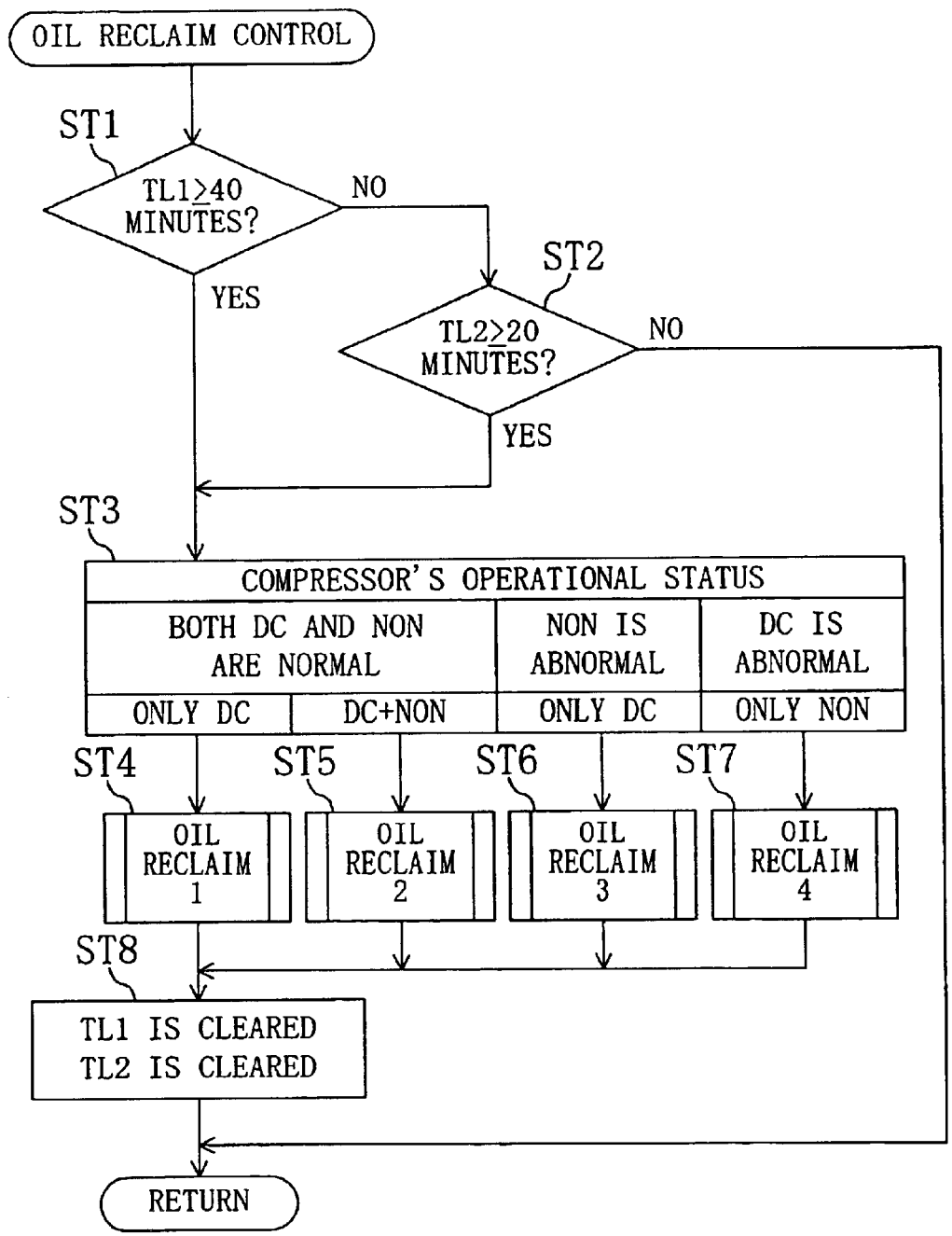
FIG. 10 is a flow chart for setting an oil reclaim operation according to the operational state of a compressor.

In the steps ST1 and ST2 of the flowchart of FIG. 10, firstly the operating time of each of the compressors (2A, 2B) of the compression mechanism (2D) of the first system is determined. More specifically, in the step ST1, it is determined, based on the value of a timer (TL1), whether one of the compressors (2A, 2B) or both have been operated continuously for not less than 40 minutes. In the step ST2, it is determined based on the value of a timer (TL2) whether at least the inverter compressor (2A) of the two compressors (2A, 2B) has been operated at a high frequency for not less than 20 minutes in total. And, if either one of the determination results is "YES", then the procedure proceeds to the step ST3. On the other hand, if both the determination results are "NO", then the procedure returns to the step ST1 without carrying out any oil reclaim operation and the aforesaid determination steps are repeated. Hereby, when the requirements for the operating time of the compression mechanism (2D) are met, the cold storage heat exchanger (45) is subjected to an oil reclaim operation. On the other hand, when the requirements are not met, an oil reclaim operation is held in abeyance.

Figure 11:
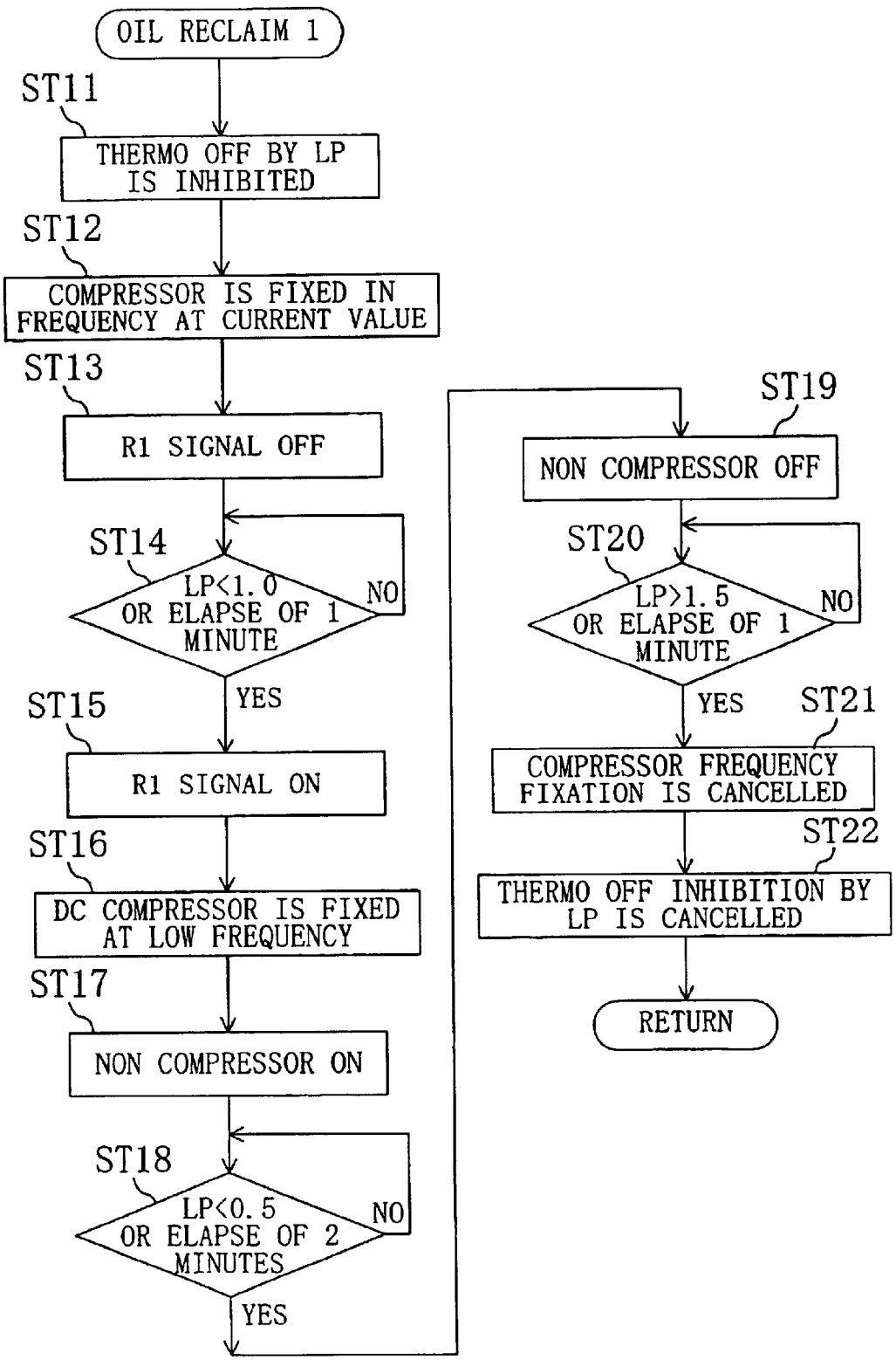
FIG. 11 is a flow chart showing operations in OIL RECLAIM 1.
Figure 12:
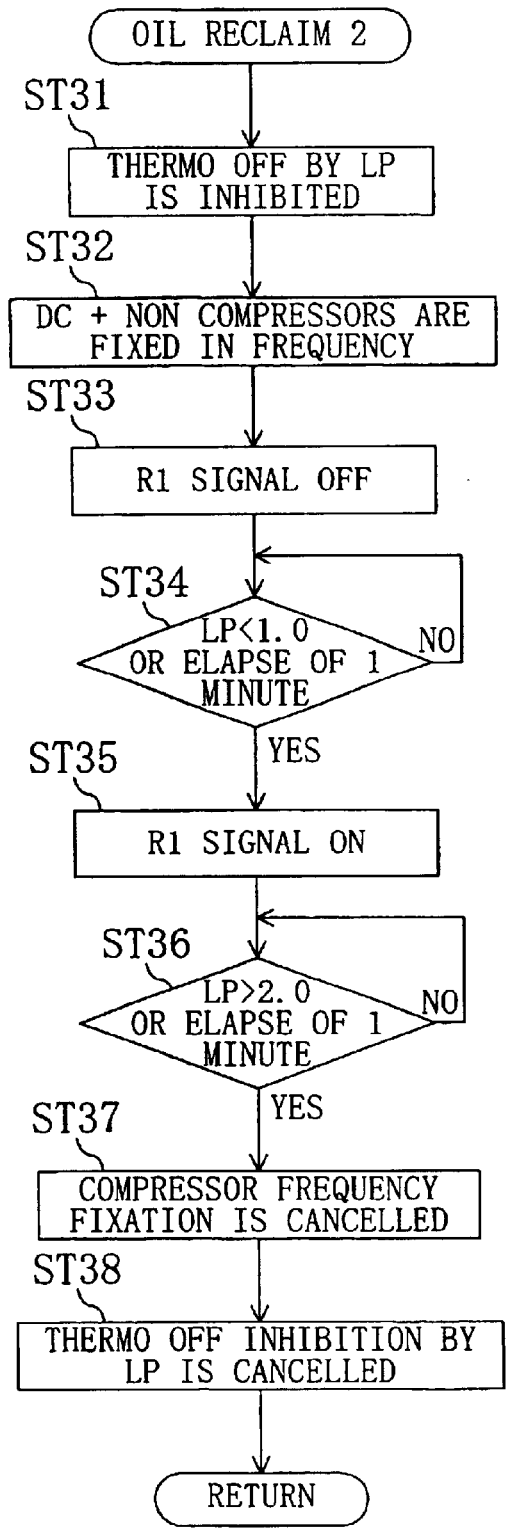
FIG. 12 is a flow chart showing operations in OIL RECLAIM 2.
Figure 13:
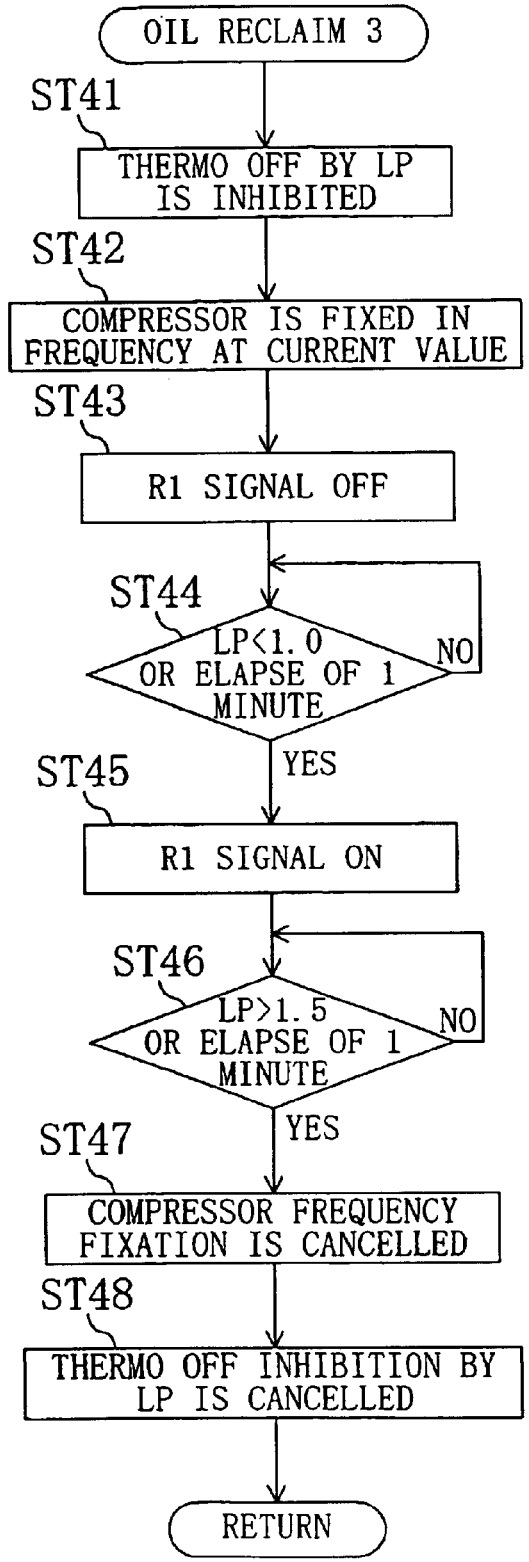
FIG. 13 is a flow chart showing operations in OIL RECLAIM 3.
Figure 14:
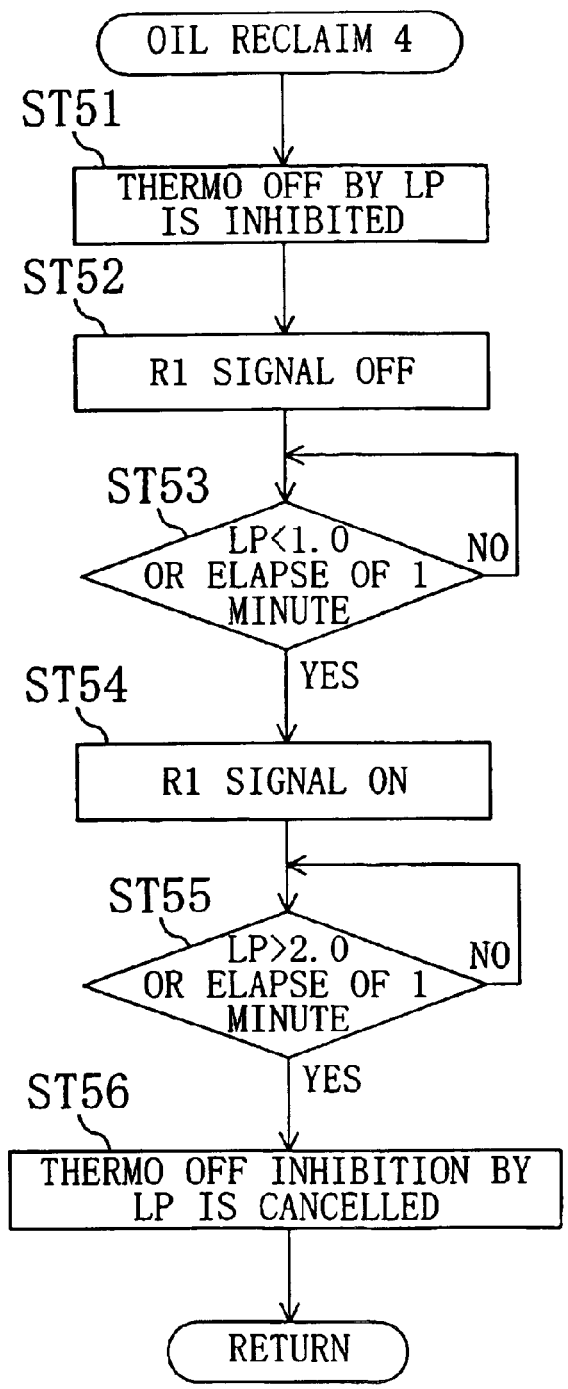
FIG. 14 is a flow chart showing operations in OIL RECLAIM 4.

In the step ST3, based on the operational status of the compressors (2A, 2B), one of the following four oil reclaim operations is selected. Firstly, if both the compressors (2A, 2B) are normal and, in addition, only the inverter compressor (2A) is being activated, then the procedure proceeds to the step ST4, and an "OIL RECLAIM OPERATION 1", shown in the flowchart of FIG. 11, is selected. Additionally, if both the compressors (2A, 2B) are normal and, in addition, both the compressors (2A, 2B) are being activated, then the procedure proceeds to the step ST5, and an "OIL RECLAIM OPERATION 2", shown in the flowchart of FIG. 12, is selected. On the other hand, if there occurs an abnormality in the first non inverter compressor (2B) and only the inverter compressor (2A) is being activated, then the procedure proceeds to the step ST6, and an "OIL RECLAIM OPERATION 3", shown in the flowchart of FIG. 13, is selected. Additionally, if there occurs an abnormality in the inverter compressor (2A) and only the first non inverter compressor (2B) is being activated, then the procedure proceeds to the step ST7, and an "OIL RECLAIM OPERATION 4", shown in the flowchart of FIG. 14, is selected.

And, after an oil reclaim operation selected according to the operational status of the compression mechanism (2D) is executed, the procedure proceeds to the step ST8 and the timers (TL1, TL2) are cleared. The procedure returns to the start, i.e., the step ST1.

In the steps ST1 and ST2, the setting values of the timers (TL1) and (TL2), which serve as determination reference values, are 40 minutes and 20 minutes. However, since the accumulability of refrigerating machine oil in the cold storage heat exchanger (45) varies depending on the installation requirements of the refrigerating apparatus (1), it is advisable that these setting values are set according to the installation requirements. For example, in the case where the outdoor unit (1A) is installed at a level above the cold storage unit (1C), and there is a great difference in vertical level between the outdoor unit (1A) and the cold storage unit (1C), refrigerating machine oil is likely to accumulate in the cold storage heat exchanger (45). Therefore, it is advisable that the determination reference values of the timers (TL1, TL2) are set lower. For example, the setting value of the timer (TL1) may be changed from 40 minutes down to 30 minutes, and the setting value of the timer (TL2) may be changed from 20 minutes down to 15 minutes.

Referring now to FIG. 11, the contents of the OIL RECLAIM OPERATION 1 will be described in detail. When the flowchart of FIG. 11 is executed, both the compressors (2A, 2B) are normal and only the inverter compressor (2A) is being activated.

Firstly, in the step ST11, it is set such that, even when the low-level pressure (LP) of the refrigerant circuit (1E) falls below a predetermined value, no thermo off operation is performed on the cold storage showcase. Stated another way, during the normal control period, the low-level pressure (LP) falls when the cold storage showcase is cooled sufficiently, so that it is arranged such that refrigerant is not allowed to flow through the cold storage heat exchanger (45) by placing the showcase in the thermo off state on the basis of the value of the low-level pressure (LP). However, if a thermo off operation is executed during the oil reclaim operation, this brings on operational inconveniences. Therefore, execution of a thermo off operation is inhibited, thereby allowing an oil reclaim operation to be carried out preferentially.

Next, in the step ST12, the operational frequency of the inverter compressor (2A) in operation is locked at a current frequency value. In addition, in the step ST13, an R1 signal for operating the solenoid valve (7a) of the cold storage unit (1C) is placed in the off state and, as a result, the solenoid valve (7a) enters the closed position, thereby reducing the rate of flow of refrigerant in the cold storage heat exchanger (45). As the result of this, the degree of superheat of the refrigerant on the outlet side of the cold storage heat exchanger (45) is forcibly increased.

And, in the steps ST14 and ST15, when the low-level pressure (LP) falls below 1.0 Kg/cm$^2$ (98 KPa) or when a length of one minute has elapsed, the R1 signal is placed in the on state and, as a result, the solenoid valve (7a) enters the opened position. Stated another way, for example, if all the solenoid valves (7a) of the three cold storage showcases are placed in the closed position at the same time when the freeze storage showcase is in the thermo off state, this causes the low-level pressure (LP) to fall. And, if the low-level pressure (LP) falls too low, this produces a state in which refrigerant flows, in only a very small amount, through the cold storage heat exchanger (45) and the inside of the cold storage showcases is not cooled. To cope with this, the lower limit of the low-level pressure (LP) is set so as to maintain a state in which refrigerant flows even a little. In addition, the length of time, for which the solenoid valve (7a) is placed in the closed position, is one minute at most, the reason of which is that it is believed that such a length of time is long enough to sufficiently increase the degree of superheat of the refrigerant on the outlet side of the cold storage heat exchanger (45).

At the stage when the operations up to the step ST15 are executed, the cold storage expansion valve (46) is opened a little more than usual because the degree of superheat of the refrigerant is increased at the outlet of the cold storage heat exchanger (45), and, furthermore, the solenoid valve (7a) is also placed in the opened position. In this state, in the steps ST16 and ST17, the frequency of the inverter compressor (2A) is set to a low frequency value and the first non inverter compressor (2B) is made active, for performing an operation of increasing the rate of flow of refrigerant in comparison with the anterior state in which only the inverter compressor (2A) is made active. This forces liquid refrigerant to flow, at a rapid rate, into the cold storage heat exchanger (45), so that refrigerating machine oil that has accumulated inside the cold storage heat exchanger (45) flows out through the low pressure gas pipe (15) together with refrigerant. The rate of flow of refrigerant is increased because the diameter of the low pressure gas pipe (15) is great, therefore making it difficult for refrigerating machine oil to return to the compressors (2A, 2B) unless the rate of flow of refrigerant is sufficiently great. In addition, since most of the refrigerant evaporates while flowing through the cold storage heat exchanger (45), liquid compression due to liquid back does not occur in the compressors (2A, 2B).

In the step ST18, it is detected whether the low-level pressure (LP) falls below 0.5 Kg/cm$^2$ (49 KPa) when the cold storage expansion valve (46) is restricted by a sudden flow of liquid refrigerant or it is detected whether a length of two minutes has elapsed. If either one of these requirements is met, it is determined that the refrigerating machine oil accumulated is almost reclaimed. Therefore, the procedure proceeds to the step ST19. The first non inverter compressor (2B) is brought into a halt and the rate of flow of refrigerant is reduced.

The step ST20 is a step of waiting for the low-level pressure (LP) to have increased to above 1.5 Kg/cm$^2$ (147 KPa) or of waiting until a length of one minute has elapsed so that a thermo off operation is not carried out upon termination of the operation of the flowchart. And, when either one of the requirements is met, the lock of the frequency of the inverter compressor (2A) is freed in the step ST21, and the inhibition of a thermo off operation is also cancelled in the step ST22. The OIL RECLAIM OPERATION 1 is now completed and the system operation returns to normal.

In the above-described oil reclaim operation, the value of the low-level pressure (LP) is used to prevent the occurrence of operational inconvenience and, basically, control based on a pre-set length of time is carried out.

Referring next to FIG. 12, the OIL RECLAIM OPERATION 2 will be described. At the time when the flowchart of FIG. 12 is executed, both the compressors (2A, 2B) are normal and both the inverter compressor (2A) and the first non inverter compressor (2B) are being activated.

Firstly, in the step ST31, it is set such that, even when the low-level pressure (LP) of the refrigerant circuit (1E) falls below a predetermined value, no thermo off operation is performed on the cold storage showcase so that an oil reclaim operation is performed preferentially, as in the step ST11 of the OIL RECLAIM OPERATION 1.

Next, in the step ST32, the lock of operational displacement is carried out, with the inverter compressor (2A) turning at a low frequency, and with the first non inverter compressor (2B) placed in operation. In addition, in the step ST33, the R1 signal for the operation of the solenoid valve (7a) of the cold storage unit (1C) is placed in the off state and, as a result, the solenoid valve (7a) enters the closed position, thereby reducing the rate of flow of refrigerant in the cold storage heat exchanger (45). This forcibly increases the degree of superheat of the refrigerant on the outlet side of the cold storage heat exchanger (45).

And, in the steps ST34 and ST35, if either the low-level pressure (LP) falls below 1.0 Kg/cm$^2$ (98 KPa) or a length of one minute elapses, the R1 signal is placed in the on state, thereby placing the solenoid valve (7a) in the opened position. Hereby, the degree of superheat of the refrigerant on the outlet side of the cold storage heat exchanger (45) is made sufficiently great for a period of one minute at most while maintaining a state in which refrigerant flows even a little, as in the steps ST14 and ST15 of the OIL RECLAIM OPERATION 1.

At the stage when the operations up to the step ST35 have been executed, the cold storage expansion valve (46) is opened a little more than usual because the degree of superheat of the refrigerant at the outlet of the cold storage heat exchanger (45) is increased, and, in addition, the solenoid valve (7a) is also placed in the opened position. In addition, since the inverter compressor (2A) is turning at low frequency and the first non inverter compressor (2B) is also being activated, refrigerant is flowing at a rate of flow sufficient enough for the reclaiming of accumulated refrigerating machine oil. Accordingly, a sufficient amount of liquid refrigerant flows into the cold storage heat exchanger (45), whereby refrigerating machine oil accumulated inside the cold storage heat exchanger (45) is forced to flow out through the low pressure gas pipe (15) together with the refrigerant.

The step ST36 is a step of waiting for the low-level pressure (LP) to have increased to above 2.0 Kg/cm$^2$ (196 KPa) or of waiting until a length of one minute has elapsed so that a thermo off operation is not carried out upon termination of the operation of the flowchart. And, when either one of the requirements is met, the lock of the frequency of the inverter compressor (2A) is freed in the step ST37, and the inhibition of a thermo off operation is also cancelled in the step ST38. The OIL RECLAIM OPERATION 2 is now completed.

Referring next to FIG. 13, the OIL RECLAIM OPERATION 3 will be described. When the flowchart of FIG. 13 is executed, there occurs an abnormality in the first non inverter compressor (2B) and only the inverter compressor (2A) is being activated.

Firstly, in the step ST41, it is set such that, even when the low-level pressure (LP) of the refrigerant circuit (1E) falls below a predetermined value, no thermo off operation is performed on the cold storage showcase so that an oil reclaim operation is performed preferentially, as in the OIL RECLAIM OPERATIONS 1 and 2.

Next, in the step ST42, the frequency of the inverter compressor (2A) is fixed to lock the operational displacement. In addition, in the step ST43, the R1 signal for the operation of the solenoid valve (7a) of the cold storage unit (1C) is placed in the off state and, as a result, the solenoid valve (7a) enters the closed position, thereby reducing the rate of flow of refrigerant in the cold storage heat exchanger (45). This forcibly increases the degree of superheat of the refrigerant on the outlet side of the cold storage heat exchanger (45).

And, in the steps ST44 and ST45, if either the low-level pressure (LP) falls below 1.0 Kg/cm$^2$ (98 KPa) or a length of one minute elapses, the R1 signal is placed in the on state, thereby placing the solenoid valve (7a) in the opened position. Hereby, the degree of superheat of the refrigerant on the outlet side of the cold storage heat exchanger (45) is made sufficiently great for a period of one minute at most while maintaining a state in which refrigerant flows even a little, as in the OIL RECLAIM OPERATIONS 1 and 2.

At the stage when the operations up to the step ST45 have been executed, the cold storage expansion valve (46) is opened a little more than usual because the degree of superheat of the refrigerant at the outlet of the cold storage heat exchanger (45) is increased, and, furthermore, the solenoid valve (7a) is also placed in the opened position. Consequently, liquid refrigerant flows into the cold storage heat exchanger (45), whereby refrigerating machine oil that has accumulated inside the cold storage heat exchanger (45) flows out through the low pressure gas pipe (15) together with the refrigerant.

The step ST46 is a step of waiting for the low-level pressure (LP) to have increased to above 1.5 Kg/cm$^2$ (147 KPa) or of waiting until a length of one minute has elapsed so that a thermo off operation is not carried out upon termination of the operation of the flowchart. And, when either one of the requirements is met, the lock of the frequency of the inverter compressor (2A) is freed in the step ST47, and the inhibition of a thermo off operation is also cancelled in the step ST48. The OIL RECLAIM OPERATION 3 is now completed.

Referring next to FIG. 14, the OIL RECLAIM OPERATION 4 will be described. When the flowchart of FIG. 14 is executed, there occurs an abnormality in the inverter compressor (2A) and only first non inverter compressor (2B) is being activated.

Firstly, in the step ST51, it is set such that, even when the low-level pressure (LP) of the refrigerant circuit (1E) falls below a predetermined value, no thermo off operation is performed on the cold storage showcase so that an oil reclaim operation is performed preferentially, as in the OIL RECLAIM OPERATIONS 1–3.

In the next step ST52, with only the first non inverter compressor (2B) placed in operation, the R1 signal for the operation of the solenoid valve (7a) of the cold storage unit (1C) is placed in the off state and, as a result, the solenoid valve (7a) enters the closed position, whereby the rate of flow of the refrigerant in the cold storage heat exchanger (45) is reduced. This forcibly increases the degree of superheat of the refrigerant on the outlet side of the cold storage heat exchanger (45).

And, in the steps ST53 and ST54, if either the low-level pressure (LP) falls below 1.0 Kg/cm$^2$ (98 KPa) or a length of one minute elapses, the R1 signal is placed in the on state, thereby placing the solenoid valve (7a) in the opened position. Hereby, the degree of superheat of the refrigerant on the outlet side of the cold storage heat exchanger (45) is made sufficiently great for a period of one minute at most while maintaining a state in which refrigerant flows even a little, as in the OIL RECLAIM OPERATIONS 1–3.

At the stage when the operations up to the step ST54 have been executed, the cold storage expansion valve (46) is opened a little more than usual because the degree of superheat of the refrigerant at the outlet of the cold storage heat exchanger (45) is increased, and, furthermore, the solenoid valve (7a) is also placed in the opened position. Consequently, liquid refrigerant flows into the cold storage heat exchanger (45), whereby refrigerating machine oil that has accumulated inside the cold storage heat exchanger (45) is forced to flow out through the low pressure gas pipe (15) together with the refrigerant.

The step ST55 is a step of waiting for the low-level pressure (LP) to have increased to above 2.0 Kg/cm$^2$ (196 KPa) or of waiting until a length of one minute has elapsed so that a thermo off operation is not carried out upon termination of the operation of the flowchart. And, when either one of the requirements is met, the inhibition of a thermo off operation is cancelled in the step ST56. The OIL RECLAIM OPERATION 4 is now completed.

As has been described hereinabove, in accordance with the present embodiment, when the operating time of the compression mechanism (2D) amounts to a predetermined length of time, the solenoid valve (7a) disposed on the upstream side of the cold storage heat exchanger (45) is once closed for a while to forcibly place the outlet side of the cold storage heat exchanger (45) in the superheat state and, after the cold storage expansion valve (46) is placed in the opened position, the solenoid valve (7a) is placed in the opened state so as to cause liquid refrigerant to flow, at a rapid rate, into the cold storage heat exchanger (45). As the result of such arrangement, refrigerating machine oil that has accumulated in the inside of the cold storage heat exchanger (45) is reclaimed and returned to the compression mechanism (2D). Repetition of such an operation at predetermined intervals prevents the occurrence of shortage of oil in the compression mechanism (2D) caused by accumulation of refrigerating machine oil in the cold storage heat exchanger (45).

Additionally, it is arranged such that, if the pressure of refrigerant on the suction side of the compression mechanism (2D) falls below a predetermined valve before a predetermined length of time has elapsed since the solenoid valve (7a) was closed, the solenoid valve (7a) is placed forcibly in the opened position. This prevents the occurrence of such a state that no cooling capacity is obtained because the pressure of refrigerant on the suction side falls too low.

Furthermore, it is arranged such that the operational displacement of the compression mechanism (2D) is controlled during the oil reclaim operation unless there occurs a compressor abnormality. This arrangement ensures that residual refrigerating machine oil in the inside of the cold storage heat exchanger (45) is reclaimed without fail.

In addition to the above, execution of a thermo off operation is inhibited during the oil reclaim operation, thereby making it possible to preferentially perform an oil reclaim operation. As a result, it becomes possible to prevent the occurrence of inconvenience which may take place during the oil reclaim operation. Furthermore, since the solenoid valve (7a) for thermo off is used also in the oil reclaim operation, this prevents the structure of the refrigerating apparatus from becoming complicated.

Besides, refrigerating machine oil can be reclaimed by the operation of the indoor expansion valve (42) in the indoor heat exchanger (41) and any oil reclaim operation is unnecessary for the refrigeration heat exchanger (51) since refrigerating machine oil is unlikely to accumulate there. It is ensured that refrigerating machine oil is reclaimed easily from the cold storage heat exchanger (45) in spite of the use of a temperature sensitive expansion valve as the cold storage expansion valve (46) which usually makes an oil reclaim operation difficult to carry out and in spite of employing a multi-type construction in which refrigerating machine oil is likely to accumulate.

Other Embodiments

The present invention may be constructed as follows with respect to the above-described embodiment.

For example, in the embodiment described hereinabove, a single inverter compressor and two non inverter compressors are used. However, the number of compressors may be modified and the combination of inverter and non inverter compressors may be modified.

In addition, although in the above-described embodiment the description has been made in terms of a refrigerating apparatus which performs air conditioning operations, cold storage operations, and refrigeration operations, the present invention can be applied also to apparatus for cold and freeze storage. To sum up, the present invention is applicable to any type of refrigerating apparatus that uses a temperature sensitive expansion valve as an expansion mechanism.

Industrial Applicability

As has been described hereinabove, the present invention is usefully applicable to refrigerating apparatus.

What is claimed is:

1. A refrigerating apparatus comprising a refrigerant circuit along which are provided a compression mechanism, a condenser, an expansion mechanism, and an evaporator all connected in sequence, and an oil reclaim mechanism for reclaiming refrigerating machine oil that has accumulated in said evaporator and returning it to said compression mechanism, wherein said expansion mechanism is a temperature sensitive type expansion valve whose valve travel is controlled based on the state of refrigerant on the side of an outlet of said evaporator and said oil reclaim mechanism includes a switching valve connected to an upstream side of said evaporator and control means for controlling said switching valve, and wherein said control means is configured so that, in an oil reclaim operation, the degree of superheat of said outlet of said evaporator is increased by operating said refrigerating apparatus with said switching valve placed in the closed position for a predetermined length of time, after which said refrigerating apparatus is operated with said switching valve placed in the opened position.

2. The refrigerating apparatus of claim 1, wherein said control means is configured so that an oil reclaim operation is carried out when the operating time of said compression mechanism amounts, in continuity or in total, to a predetermined length of time.

3. The refrigerating apparatus of claim 1, wherein said control means is configured so that said switching valve is placed in the opened position if, during an oil reclaim operation, the pressure of refrigerant on the suction side of said compression mechanism falls below a predetermined value before a predetermined length of time has elapsed since said switching valve was placed in the closed position.

4. The refrigerating apparatus of claim 1, wherein:

said compression mechanism is variable in displacement, and said control means is configured so that, at the time when placing said switching valve in the opened position during an oil reclaim operation, the operational displacement of said compression mechanism is set to such a displacement value that refrigerating machine oil inside said evaporator is reclaimed by refrigerant.

5. The refrigerating apparatus of claim 1, wherein said control means is configured so that execution of a thermo off operation is inhibited during an oil reclaim operation.

6. The refrigerating apparatus of claim 1, wherein a plurality of evaporators are connected in parallel and a switching valve is disposed upstream of each said evaporator.

* * * * *

UNITED STATES PATENT AND TRADEMARK OFFICE
CERTIFICATE OF CORRECTION

PATENT NO. : 6,986,259 B2  
APPLICATION NO. : 10/479829  
DATED : January 17, 2006  
INVENTOR(S) : Masaaki Takegami et al.

It is certified that error appears in the above-identified patent and that said Letters Patent is hereby corrected as shown below:

Title page, item (54), should read --REFRIGERATING APPARATUS--

Signed and Sealed this

Eleventh Day of July, 2006

JON W. DUDAS  
*Director of the United States Patent and Trademark Office*